United States Patent
Xu et al.

(10) Patent No.: US 12,553,900 B2
(45) Date of Patent: Feb. 17, 2026

(54) SYSTEMS AND METHODS FOR ASSAYING LARGE MOLECULES WITH IMPROVED SENSITIVITY

(71) Applicant: Genentech, Inc., South San Francisco, CA (US)

(72) Inventors: Keyang Xu, South San Francisco, CA (US); Jintang He, South San Francisco, CA (US); Surinder Kaur, South San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 622 days.

(21) Appl. No.: 17/965,406

(22) Filed: Oct. 13, 2022

(65) Prior Publication Data
US 2023/0296620 A1    Sep. 21, 2023

Related U.S. Application Data

(63) Continuation of application No. PCT/US2021/027634, filed on Apr. 16, 2021.
(Continued)

(51) Int. Cl.
*G01N 33/68* (2006.01)
*B01D 15/18* (2006.01)
(Continued)

(52) U.S. Cl.
CPC ..... *G01N 33/6848* (2013.01); *B01D 15/1878* (2013.01); *B01D 15/325* (2013.01);
(Continued)

(58) Field of Classification Search
CPC .... G01N 33/6848; G01N 30/20; G01N 30/32; G01N 30/463; G01N 30/7233;
(Continued)

(56) References Cited

U.S. PATENT DOCUMENTS

| 2017/0315101 A1 | 11/2017 | Green et al. |
| 2019/0101513 A1 | 4/2019 | Phoebe et al. |

FOREIGN PATENT DOCUMENTS

| CN | 1712956 A | 12/2005 |

OTHER PUBLICATIONS

Lin, Yu-Zhou et al., Simultaneous determination of vitamin A, D3 and E in infant formula milk powder and rice flour by two-dimensional liquid chromatography/double detector. Science and Technology of Food Industry, vol. 37, No. 20, pp. 68-77, 2016, English Abstract Only.
(Continued)

*Primary Examiner* — Jennifer Wecker
*Assistant Examiner* — Steven Ray Castaneda
(74) *Attorney, Agent, or Firm* — McNeill PLLC

(57) ABSTRACT

The present application relates to systems and methods for assaying presence of large molecule analytes, such as proteins, e.g., antibodies, antigens, receptors, and the like, using a targeted two-dimensional liquid chromatography, tandem mass spectrometry (2D-LC-MS/MS) system, optionally combined with affinity capture. In some aspects, the system is partially or fully automated. In some aspects, the system may allow detection of protein biomarkers (e.g., antibodies or antigens) from clinical or nonclinical biological tissue or fluid samples in the pg/mL to ng/mL range.

19 Claims, 19 Drawing Sheets

Specification includes a Sequence Listing.

Related U.S. Application Data

(60) Provisional application No. 63/011,572, filed on Apr. 17, 2020.

(51) Int. Cl.
  *B01D 15/32* (2006.01)
  *G01N 30/20* (2006.01)
  *G01N 30/32* (2006.01)
  *G01N 30/46* (2006.01)
  *G01N 30/72* (2006.01)
  *G01N 30/88* (2006.01)
  G01N 30/02 (2006.01)

(52) U.S. Cl.
  CPC .............. *G01N 30/20* (2013.01); *G01N 30/32* (2013.01); *G01N 30/463* (2013.01); *G01N 30/7233* (2013.01); *G01N 30/88* (2013.01); G01N 2030/027 (2013.01); G01N 2030/326 (2013.01); G01N 2030/8831 (2013.01); G01N 2333/976 (2013.01)

(58) Field of Classification Search
  CPC .............. G01N 30/88; G01N 2030/027; G01N 2030/326; G01N 2030/8831; G01N 2333/976; G01N 30/89; B01D 15/1878; B01D 15/325
  See application file for complete search history.

(56) References Cited

OTHER PUBLICATIONS

Morales-Betanzos, Carlos A. et al., "Quantitative Mass Spectrometry Analysis of PD-L1 Protein Expression, N-glycosylation and Expression Stoichiometry with PD-1 and PD-L2 in Human Melanoma", Molecular & Cellular Proteomics 16: 10.1074/mcp.RA117.000037, 1705-1717, 2017.

Zhang, Qian et al., "Multiplex Immuno-Liquid Chromatography-Mass Spectrometry-Parallel Reaction Monitoring (LC-MS-PRM) Quantitation of CD8A, CD4, LAG3, PD1, PD-L1, and PD-L2 in Frozen Human Tissues", J. Proteome Res. 2018, 17, 3932-3940.

Doneanu, Catalin et al., "Analysis of host-cell proteins in biotherapeutic proteins by comprehensive online two-dimensional liquid chromatography/mass spectrometry", MABS, vol. 4, No. 1, Jan. 1, 2012, pp. 24-44.

PCT International Search Report and Written Opinion from PCT/US2021/027634 mailed Aug. 11, 2021, 14 pages.

Sandra, Koen et al., "Highly efficient peptide separations in proteomics Part 2: Bi- and multidimensional liquid-based separation techniques", Journal of Chromatography B, vol. 877, No. 11-12, Feb. 27, 2009, pp. 1019-1039.

Vanhoenacker, Gerd et al., "Comprehensive two-dimensional liquid chromatography of therapeutic monoclonal antibody digests", Analytical and Bioanalytical Chemistry, vol. 407, No. 1, Nov. 20, 2014, pp. 355-366.

Zhou, Yuan et al., "Mass Defect-Based Pseudo-Isobaric Dimethyl Labeling for Proteome Quantification", Analytical Chemistry, vol. 85, No. 22, Nov. 19, 2013, pp. 10658-10663.

SEQUENCE LISTING

```
Sequence total quantity: 11
SEQ ID NO: 1            moltype = AA  length = 13
FEATURE                 Location/Qualifiers
REGION                  1..13
                        note = Anti-CD22 peptide fragment
source                  1..13
                        mol_type = protein
                        organism = synthetic construct
SEQUENCE: 1
IYPGDGDTNY SGK                                                         13

SEQ ID NO: 2            moltype = AA  length = 13
FEATURE                 Location/Qualifiers
REGION                  1..13
                        note = Modified anti-CD22 peptide fragment
SITE                    13
                        note = misc_feature - Xaa is Lysine (13C6,15N2)
source                  1..13
```

```
                         mol_type = protein
                         organism = synthetic construct
SEQUENCE: 2
IYPGDGDTNY SGX                                                      13

SEQ ID NO: 3             moltype = AA   length = 12
FEATURE                  Location/Qualifiers
REGION                   1..12
                         note = Anti-CD22 peptide fragment
source                   1..12
                         mol_type = protein
                         organism = synthetic construct
SEQUENCE: 3
LSCAASGYEF SR                                                       12

SEQ ID NO: 4             moltype = AA   length = 12
FEATURE                  Location/Qualifiers
REGION                   1..12
                         note = Modified anti-CD22 peptide fragment
SITE                     3
                         note = misc_feature - Xaa is carboxamidomethyl-modified
                          Cysteine
source                   1..12
                         mol_type = protein
                         organism = synthetic construct
SEQUENCE: 4
LSXAASGYEF SR                                                       12

SEQ ID NO: 5             moltype = AA   length = 12
FEATURE                  Location/Qualifiers
REGION                   1..12
                         note = Modified anti-CD22 peptide fragment
SITE                     3
                         note = misc_feature - Xaa is carboxamidomethyl-modified
                          Cysteine
SITE                     12
                         note = misc_feature - Xaa is Arginine (13C6,15N4)
source                   1..12
                         mol_type = protein
                         organism = synthetic construct
SEQUENCE: 5
LSXAASGYEF SX                                                       12

SEQ ID NO: 6             moltype = AA   length = 8
FEATURE                  Location/Qualifiers
REGION                   1..8
                         note = PD-L1 peptide fragment
source                   1..8
                         mol_type = protein
                         organism = synthetic construct
SEQUENCE: 6
LQDAGVYR                                                             8

SEQ ID NO: 7             moltype = AA   length = 8
FEATURE                  Location/Qualifiers
REGION                   1..8
                         note = Modified PD-L1 peptide fragment
SITE                     8
                         note = misc_feature - Xaa is Arginine (13C6,15N4)
source                   1..8
                         mol_type = protein
                         organism = synthetic construct
SEQUENCE: 7
LQDAGVYX                                                             8

SEQ ID NO: 8             moltype = AA   length = 9
FEATURE                  Location/Qualifiers
REGION                   1..9
                         note = Bevacizumab peptide fragment
source                   1..9
                         mol_type = protein
                         organism = synthetic construct
SEQUENCE: 8
FTFSLDTSK                                                            9

SEQ ID NO: 9             moltype = AA   length = 9
FEATURE                  Location/Qualifiers
REGION                   1..9
                         note = Modified bevacizumab peptide fragment
```

```
SITE                    9
                        note = misc_feature - Xaa is Lysine (13C6,15N2)
source                  1..9
                        mol_type = protein
                        organism = synthetic construct
SEQUENCE: 9
FTFSLDTSX                                                                      9

SEQ ID NO: 10           moltype = AA  length = 17
FEATURE                 Location/Qualifiers
REGION                  1..17
                        note = Herceptin peptide fragment
source                  1..17
                        mol_type = protein
                        organism = synthetic construct
SEQUENCE: 10
TTPPVLDSDG SFFLYSK                                                             17

SEQ ID NO: 11           moltype = AA  length = 17
FEATURE                 Location/Qualifiers
REGION                  1..17
                        note = Modified herceptin peptide fragment
SITE                    17
                        note = misc_feature - Xaa is Lysine (13C6,15N2)
source                  1..17
                        mol_type = protein
                        organism = synthetic construct
SEQUENCE: 11
TTPPVLDSDG SFFLYSX                                                             17
```

SYSTEMS AND METHODS FOR ASSAYING LARGE MOLECULES WITH IMPROVED SENSITIVITY

CROSS-REFERENCE TO RELATED APPLICATIONS

This application is a continuation of International Patent Application No. PCT/US2021/027634, filed Apr. 16, 2021, which claims the benefit of priority of U.S. Provisional Patent Application No. 63/011,572, filed Apr. 17, 2020, the contents of which are incorporated herein by reference in their entireties.

SEQUENCE LISTING

This application contains a Sequence Listing XML in computer readable form entitled "2023-08-03_01164-0005-00US_ST26," created Mar. 8, 2023, having a size of 17,715 Bytes, which is incorporated by reference herein.

FIELD

The present application relates to systems and methods for assaying presence of large molecule analytes, such as proteins, e.g., antibodies, antigens, receptors and the like, using a targeted two-dimensional liquid chromatography, tandem mass spectrometry (2D-LC-MS/MS) system, optionally combined with affinity capture. In some aspects, the system is partially or fully automated. In some aspects, the system may allow detection of protein biomarkers (e.g. antibodies or antigens) from clinical or nonclinical biological tissues or fluid samples in the pg/mL to ng/mL range.

BACKGROUND

Historically, ligand binding assays have been the technology of choice to support pharmacokinetics and biomarker assessments for drug development (1). This technology is well established and relatively easy to perform, and has both high sensitivity and assay throughput. Therefore, it has been widely used for bioanalytical purposes. However, a major limitation of ligand binding assays is that the performance highly relies on the availability and quality of critical reagents, typically an antibody or a pair of antibodies (1-3). Antibody development is difficult and costly, and usually requires a 3- to 6-month lead time (4, 5). Due to this limitation, reagent-independent bioanalytical strategies are highly desirable when high quality antibody reagents are not available or when a shorter assay development time is needed.

Mass spectrometry can be a powerful alternative analytical tool for the assessment of pharmacokinetics and biomarkers in drug development. In addition, structural information on the analyte can be obtained. Compared with ligand binding assays, a major advantage of mass spectrometry-based assays is that they are less dependent on high quality binding reagents. However, a key limitation is their relatively lower sensitivity.

Liquid chromatography-tandem mass spectrometry (LC-MS/MS) has been used as an alternative to ligand binding assays, and is capable of quantifying proteins in a reagent-independent manner (6-10). However, without enrichment using a highly specific capture reagent such as anti-idiotypic antibody, the sensitivity of conventional LC-MS/MS is relatively low—typically in the 100 ng/mL to low μg/mL range for monoclonal antibodies (11-13), for example. This can be insufficient to measure antibody therapeutics at the trough level and may not be adequately sensitive for certain biomarkers.

Two-dimensional liquid chromatography (2D-LC) based approaches have been employed to enhance the sensitivity compared to one-dimensional LC-MS/MS. An additional step of LC separation is included to enrich the analyte and reduce matrix interference from molecules in the sample. Keshishian, H. et al. successfully quantified cardiovascular biomarkers in the low ng/mL range in human plasma using an immunodepletion, offline strong cation exchange (SCX) fractionation and nano-LC-MS/MS approach (14). More recently, Shi, T. et al. developed a PRISM-SRM method which combines offline high-pH reversed-phase liquid chromatography (RPLC) fractionation and nano-LC-MS/MS, enabling quantification of proteins in the pg/mL range in human plasma/serum (15). Compared with SCX, high-pH RPLC may offer higher resolution, higher recovery and more reproducible separation of peptides, and the salt-free mobile phases may be more compatible with MS detection (16). A limitation of the above methods is that they are labor intensive and relatively low-throughput. To address these issues, there have been several attempts to automate the high- and low-pH RPLC based 2D-LC-MS/MS methods. For example, Shen, Y. et al. (17) and Zhang, G. et al. (18) implemented a method where high-pH and low-pH RPLC were controlled by two stand-alone HPLC systems with analytical flow, enabling quantification of immunoglobulin A1 protease and myostatin with a lower limit of quantification (LLOQ) of 50 ng/mL and 2.5 ng/mL, respectively. In another report, Zhang M. et al. described a trapping-micro-LC-MS strategy where the target peptide and all the matrix molecules eluting before the target peptide in high-pH RPLC were selectively transferred to a high capacity trap column at a high flow rate, which were then subject to the second-dimension micro-flow LC-MS analysis operating at a low flow rate. This method allowed for a 13-fold and 4-fold improvement in sensitivity compared to conventional analytical flow 1D-LC-MS/MS and microflow 1D-LC-MS/MS, respectively (19). A relatively wide trapping window was used in this method. Although the data demonstrated that over 80% of matrix peptides were removed from the trap column prior to the micro-LC-MS analysis, the assay sensitivity may have been compromised by the significant amount of matrix molecules captured by the trap column that could still co-elute with the target peptide.

Methods and systems described herein utilize 2D-LC with mass spectrometry detection in a manner that, in some aspects, allows for both full automation and an increased sensitivity compared to 1D-LC-MS/MS methods.

SUMMARY

This disclosure relates to methods of detecting an analyte in a sample. In some embodiments, the methods comprise: (a) performing high pH reversed phase liquid chromatography (RPLC) survey scan with detection by mass spectrometry (MS) on the analyte at previously determined concentration in the presence of an internal standard, to determine the peak apex ($T_{apex}$) of the analyte; (b) obtaining an experimental sample comprising the analyte; (c) performing high pH RPLC on the sample of (b); (d) collecting at least a portion of the high pH RPLC eluate of (c) corresponding to $T_{apex}$ for the analyte+/−average peak width of the analyte or of the internal standard in the survey scan of (a), wherein the at least a portion is optionally collected in a trap column; (e) performing low pH RPLC on the collected portion of the high pH RPLC eluate of (d); and (f) detecting the analyte by MS. In some embodiments, the analyte is a peptide.

The disclosure also relates to methods of detecting a peptide analyte in a sample, comprising: (a) obtaining an experimental sample and performing an affinity-based capture to isolate a protein in the sample; (b) digesting the captured protein with a protease to obtain a peptide analyte for detection; (c) performing high pH reversed phase liquid chromatography (RPLC) survey scan with detection by mass spectrometry (MS) on the peptide analyte at previously determined concentration in the presence of an internal standard peptide, to determine the peak apex ($T_{apex}$) of the analyte; (d) performing high pH RPLC on the digested sample of (b) comprising the peptide analyte; (e) collecting at least a portion of the high pH RPLC eluate of (d) corresponding to $T_{apex}$ for the analyte+/−average peak width of the analyte, the internal standard, or a peptide in the survey scan of (c), wherein the at least a portion is optionally collected in a trap column; (f) performing low pH RPLC on the collected portion of the high pH RPLC eluate of (e); and (g) detecting the analyte by MS.

In any of the above methods, the high pH RPLC and the low pH RPLC can each be performed at microflow rates. In any of the above methods, the high pH RPLC and/or the low pH RPLC can be performed at a flow rate of 4-10 μL/min, 5-10 μL/min, 6-9 μL/min, 7-10 μL/min, 6-8 μL/min, 5 μL/min, 6 μL/min, 7 μL/min, 8 μL/min, 9 μL/min, or 10 μL/min. In some embodiments, the high pH RPLC and/or the low pH RPLC are performed on a C18 column. In some embodiments, both the high pH RPLC and the low pH RPLC are performed on a C18 column. In some embodiments, the high pH RPLC and survey scan are performed at a pH between 8 and 10, between 8 and 9, between 9 and 10, or at pH 8.0, pH 8.5, pH 9.0, pH, 9.5, or pH 10, and optionally with a mobile phase A comprising ammonium formate and a mobile phase B comprising ammonium formate and acetonitrile (e.g., ammonium formate in 90% acetonitrile). In some embodiments, the high pH RPLC survey scan and the high pH RPLC performed on the sample or digested sample are each performed at substantially the same flow rate, pH, temperature, pressure, and/or column type (e.g. C8, C18, etc.). In any of the above methods, the low pH RPLC can be performed at a pH between 2 and 4.5, between 2 and 4, between 2 and 3, between 2 and 2.5, between 2.5 and 3, between 3 and 4, or at pH 2.0, pH 2.5, pH 3.0, pH 3.5, pH 4.0, or pH 4.5, and optionally with a mobile phase A comprising formic acid and a mobile phase B comprising formic acid and acetonitrile (e.g., formic acid in acetonitrile).

In any of the above methods, the sample can be a biological sample, while in some cases, the same is not a biological sample. In some cases, the sample is a biological fluid sample, such as tears, saliva, lymph fluid, urine, serum, cerebral spinal fluid, pleural effusion, ascites, or plasma. In some embodiments, the sample is a serum sample. In some cases, the sample is a tissue sample. In some cases, the sample is treated to enrich or extract components comprising the analyte prior to use in the method.

In any of the methods herein, the portion of the high pH RPLC eluate on which the low pH RPLC is performed may correspond to a portion comprising $T_{apex}$ for the analyte+/− 0.25 minutes at a flow rate of 8 μl/min in a C18 column. In some embodiments, the portion of the high pH RPLC eluate on which the low pH RPLC is performed corresponds to a portion comprising $T_{apex}$ for the analyte+/−0.3 minutes at a flow rate of 8 μl/min in a C18 column. In some embodiments, the portion of the high pH RPLC eluate on which the low pH RPLC is performed corresponds to a portion consisting of $T_{apex}$ for the analyte+/−between 0.25 and 0.30 minutes at a flow rate of 8 μl/min on a C18 column.

In some embodiments, where the analyte is a peptide, the peptide or a protein comprising the peptide is captured by attachment to particles coated with a binding partner for the protein, such as a ligand or antigen. In some embodiments, the particles are coated with protein A, protein G, or a protein A and G chimera. In some embodiments, the protein is an antibody. In some embodiments, the analyte is a portion of an antibody (e.g., an antigen binding fragment such as a Fab, Fv, scFv, or F(ab')$_2$ fragment). In some cases, the analyte is an antigen or a drug binding target. In some embodiments, a protein analyte is cleaved into peptides and the peptides are analyzed as analytes in the methods herein. In some such cases, the protease or proteases used for the cleavage comprise one or more of: trypsin, endoproteinase LysC, endoproteinase ArgC, staph aureus V8, endoproteinase GluC, chymotrypsin, or papain.

In some cases, methods herein detect more than one analyte in the sample. Thus, in some cases, levels of two or more analytes are determined, and in some cases the methods detect a modified and unmodified form of a molecule and/or determine the ratio of a modified and unmodified form of a molecule. In some cases where the methods detect a modified and unmodified form of a molecule, the modified and unmodified forms comprise a modified and unmodified protein, such as an alkylated and nonalkylated protein or a glycosylated and unglycosylated protein, or a molecule and a metabolite of the molecule.

In some methods herein, the high pH RPLC and low pH RPLC and MS detection are automated. In some cases, detecting the analyte by MS following the low pH RPLC comprises quantitatively determining the amount or concentration of the analyte in the sample. In some embodiments, the MS is tandem MS ("MS/MS") (such as multiple reaction monitoring (MRM), single ion monitoring (SIM), triple stage quadrupole (TSQ), quadrupole/time of flight (QTOF), quadrupole linear ion trap (QTRAP), hybrid ion trap/FTMS, time of flight/time of flight (TOF/TOF), or tandem in time MS/MS).

In some embodiments, the at least a portion of high pH RPLC eluate is diluted in a low pH mobile phase prior to performing low pH RPLC, optionally further wherein the dilution is automatically controlled. In some embodiments, the methods herein allow for at least 30-fold or for 30 to 100-fold greater sensitivity in analyte detection than a single dimension HPLC-tandem MS (1D-LC-MS/MS) process at microflow rates, and/or wherein the method allows for at least 100-fold greater sensitivity in analyte detection than a single dimension HPLC-tandem MS (1D-LC-MS/MS) process at analytical flow rates.

In some embodiments, the methods allow for detection of an analyte in a tissue sample at a concentration of less than 10 fmol/μg total protein, less than 1 fmol/μg total protein, 1-10 fmol/μg total protein, less than 0.1 fmol/μg total protein, 0.1-1 fmol/μg total protein, or between 0.01 and 0.1 fmol/μg total protein; and/or detection of an analyte in a fluid sample at a concentration of less than 10 ng/mL, less than 1 ng/mL, less than 100 pg/mL, or less than 10 pg/mL, for example, such as 1-10 ng/mL, 100 pg/mL to 1 ng/mL, or 10-100 pg/mL.

This disclosure also encompasses systems for performing the methods herein. In some embodiments, the system comprises: (a) an injection valve for injecting a sample containing the analyte into the system, wherein the injection valve is connected to a high performance liquid chromatography (HPLC) column and a first dimension pump to control flow of sample and mobile phase through the column; (b) a trap column for collecting at least a pre-determined portion of a first dimension HPLC column eluate for analysis in a second dimension HPLC process; (c) a trap valve for controlling flow path of mobile phases from a first dimension HPLC process to a second dimension HPLC process; (d) a second dimension pump to control flow of mobile phases through a second dimension HPLC column; and (e) a mass spectrometer for analysis of analyte following a second dimension HPLC process. In some systems, the mass spectrometer is a tandem mass spectrometer. In some cases, the injection valve and the trap valve positions can be automatically controlled during a two-dimensional liquid chromatography process, and wherein the automatic control allows for only a pre-determined portion of eluate from the first dimension to be separated in the second dimension. In some cases, the pre-determined portion of eluate from the first dimension corresponds to a portion comprising $T_{apex}$ for the analyte+/−0.25 minutes at a flow rate of 8 μl/min in a C18 column. In some cases, the pre-determined portion of eluate from the first dimension corresponds to a portion comprising $T_{apex}$ for the analyte+/−0.3 minutes at a flow rate of 8 μl/min in a C18 column. In some cases, the pre-determined portion of eluate from the first dimension corresponds to a portion consisting of $T_{apex}$ of an analyte+/− between 0.25 and 0.30 minutes at a flow rate of 8 μl/min on a C18 column.

In some cases, the system is further capable of performing a survey scan to determine the $T_{apex}$ of an analyte in the first dimension HPLC column. In some cases, the mass spectrometer performs multiple reaction monitoring (MRM), single ion monitoring (SIM), triple stage quadrupole (TSQ), quadrupole/time of flight (QTOF), quadrupole linear ion trap (QTRAP), hybrid ion trap/FTMS, time of flight/time of flight (TOF/TOF), or tandem in time MS/MS.

In some systems herein, the analyte is a peptide. In some systems herein, the system is capable of diluting a pre-determined portion of eluate from the first dimension process in a mobile phase buffer for the second dimension process, optionally wherein the dilution is automatically controlled. Any of the methods herein may be performed on the systems described herein.

This disclosure also relates to methods in which the analyte is an anti-CD22 antibody or peptide fragment thereof, such as one or both of IYPGDGDTNYSGK (SEQ ID NO: 1) and LSCAASGYEFSR (SEQ ID NO: 3). This disclosure also relates to methods in which the analyte is PD-L1 or a peptide fragment thereof, such as an IgV domain fragment, such as LQDAGVYR (SEQ ID NO: 6), optionally wherein the sample is obtained from a subject previously treated with an immune checkpoint molecule, such as atezolizumab, and further optionally wherein the sample is a serum sample.

This disclosure also relates to methods of detecting a peptide analyte for human PD-L1 in a biological sample from a human subject, comprising: (a) obtaining a biological sample (e.g., a serum sample) from the subject and performing an affinity-based capture to isolate PD-L1 in the sample, optionally wherein the affinity-based capture comprises capturing PD-L1 complexed with an anti-PD-L1 antibody (e.g. atezolizumab); (b) digesting the captured protein with a protease to obtain a PD-L1 peptide analyte for detection (e.g. a PD-L1 IgV domain fragment, such as LQDAGVYR (SEQ ID NO: 6)); (c) performing high pH reversed phase liquid chromatography (RPLC) survey scan with detection by mass spectrometry (MS) on the PD-L1 peptide analyte at previously determined concentration in the presence of an internal standard peptide, to determine the peak apex ($T_{apex}$) of the analyte; (d) performing high pH RPLC on the digested sample of (b) comprising the peptide analyte; (e) collecting at least a portion of the high pH RPLC eluate of (d) corresponding to $T_{apex}$ for the analyte+/−average peak width of the analyte, the internal standard, or a peptide in the survey scan of (c), wherein the at least a portion is optionally collected in a trap column; (f) performing low pH RPLC on the collected portion of the high pH RPLC eluate of (e); and (g) detecting the PD-L1 peptide analyte by MS (e.g., by tandem MS such as multiple reaction monitoring (MRM), single ion monitoring (SIM), triple stage quadrupole (TSQ), quadrupole/time of flight (QTOF), quadrupole linear ion trap (QTRAP), hybrid ion trap/FTMS, time of flight/time of flight (TOF/TOF), or tandem in time MS/MS).

It is to be understood that both the foregoing description and the following further description are exemplary and explanatory only and are not restrictive of the claims.

The accompanying drawings, which are incorporated in and constitute a part of this specification, illustrate one (several) embodiment(s) and together with the description, serve to explain certain principles described herein.

BRIEF DESCRIPTION OF THE DRAWINGS

FIG. 4A shows measurements using anti-CD22 spiked in monkey serum. FIG. 4B shows measurements using Herceptin spiked in mouse serum. The LC flow rate for analytical flow and microflow LC-MS/MS was 300 μL/min and 8 μL/min, respectively. IS represents internal standard.

FIG. 8A shows the curve for peptide IYPGDGDTNYSGK (SEQ ID NO: 1) from monkey serum samples spiked with anti-CD22. FIG. 8B shows the curve for peptide IYPGDGDTNYSGK (SEQ ID NO: 1) human serum samples spiked with anti-CD22. The analyte to internal standard peak area ratio (i.e., light to heavy peak area ratio) was plotted against analyte concentration. Quality controls were also included.

FIG. 11A shows the calibration curve for peptide LSCAASGYEFSR (SEQ ID NO: 3) from monkey serum samples spiked with anti-CD22. FIG. 11B shows the calibration curve for peptide LSCAASGYEFSR (SEQ ID NO: 3) from human serum samples spiked with anti-CD22. The analyte to internal standard peak area ratio (i.e., light to heavy peak area ratio) was plotted against analyte concentration. Quality controls were also included.

FIG. 13A shows 2D-LC-MS/MS analysis of a PD-L1 sample that was subject to AC1 capture. FIG. 13B shows 2D-LC-MS/MS analysis a PD-L1 samples that was subject to AC1 capture and subsequent AC2 capture. No PD-L1 was detected from AC2, indicating that PD-L1 was completely bound by atezolizumab during AC1.

FIG. 14A shows the spike-in samples were analyzed by microflow 1D-LC-MS/MS. FIG. 14B shows the spike-in samples were analyzed by 2D-LC-MS/MS. Serum blanks and the LLOQ samples are shown here.

FIG. 15A shows the calibration curve of peptide LQDAGVYR (SEQ ID NO: 6) derived from PD-L1 IgV domain. FIG. 15B shows molar concentration of total soluble PD-L1 in 12 post-treatment serum samples. FIG. 15C shows mass concentration of soluble PD-L1 calculated based on the molecular weight of wild-type PD-L1. FIG. 15D shows the correlation between 2D-LC-MS/MS and ELISA data.

DETAILED DESCRIPTION

I. Definitions

Figure 1:
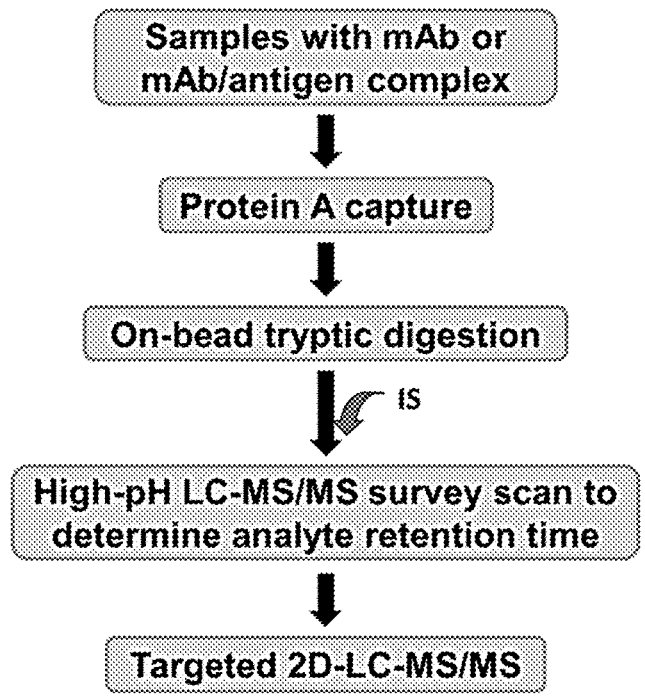
FIG. 1 shows the overall workflow of the reagent-independent, targeted 2D-LC-MS/MS method.

Unless otherwise defined, scientific and technical terms used in connection with the present invention shall have the meanings that are commonly understood by those of ordinary skill in the art.

In this application, the use of "or" means "and/or" unless stated otherwise. In the context of a multiple dependent claim, the use of "or" refers back to more than one preceding independent or dependent claim in the alternative only. Also, terms such as "element" or "component" encompass both elements and components comprising one unit and elements and components that comprise more than one subunit unless specifically stated otherwise.

As described herein, any concentration range, percentage range, ratio range or integer range is to be understood to include the value of any integer within the recited range and, when appropriate, fractions thereof (such as one tenth and one hundredth of an integer), unless otherwise indicated.

Units, prefixes, and symbols are denoted in their Systéme International de Unites (SI) accepted form. Numeric ranges are inclusive of the numbers defining the range. The headings provided herein are not limitations of the various aspects of the disclosure, which can be had by reference to the specification as a whole. Accordingly, the terms defined immediately below are more fully defined by reference to the specification in its entirety.

As utilized in accordance with the present disclosure, the following terms, unless otherwise indicated, shall be understood to have the following meanings:

A "sample" as used herein refers to any specimen that may contain an analyte needing detection or quantitation. In some embodiments, the sample is a "biological sample," which is a sample taken from a biological organism, such as a "biological fluid sample." A "biological fluid sample" as used herein refers to any biological fluid from an organism or subject in which may contain an analyte for detection. Examples include tears, saliva, lymph fluid, urine, serum, cerebral spinal fluid, pleural effusion, ascites, and plasma. A sample may be taken directly from its source (e.g. from a human or mammalian subject), or may be pre-treated to remove large debris. An "experimental sample" refers to a sample containing a previously undetermined amount of analyte, and from which the amount or concentration of analyte is to be determined.

An "analyte" refers to a substance to be detected or quantitated in a sample in the systems and methods herein. In some instances, an "analyte" is broken up into smaller fragments for detection. Thus, depending on context, an "analyte" refers to the general substance to be detected, such as a protein biomarker, for example, as well as to a peptide or other fragment of that protein biomarker that is actually separated in the chromatography and/or analyzed in a mass spectrometer.

"Liquid chromatography" or "LC" refers to a process of separating components of a sample by means of their respective interactions with a stationary phase (e.g., a column of particulate material) and a mobile (i.e., fluid) phase. LC may be performed in a single dimension (1D-LC), meaning that one separation process is run, or it may be performed in two dimensions (2D-LC), meaning that the eluate of the first separation or a portion thereof is further separated in a second separation step using a different means of separation, such as using a different mobile phase. LC encompasses, for example, HPLC and reverse phase-HPLC methods. "High-performance liquid chromatography" or "HPLC" refers to a type of LC system in which mobile phase is caused to flow through a stationary phase, such as a column, under pressure. An HPLC system may be linked to a detector such as a mass spectrometer. An HPLC process can be performed at "normal phase" ("NP" or "NP-HPLC") or "reverse phase" ("RP" or "RP-HPLC" or "RPLC"). In an RPLC process, the stationary phase (e.g., column) is non-polar while the mobile phase is polar, such as a water/polar organic solvent mixture or gradient. In normal phase HPLC, the stationary phase (e.g., column) is polar and the mobile phase is nonpolar.

"Mass spectrometry" or "MS" refers to a technique that measures the mass to charge ratio (m/z) of one or more molecules in a sample. As used herein, "tandem MS" or "MS/MS" refers to coupling of two MS analyzers. For example, a first MS analyzer may separate peptide ions by their m/z ratio, and then peptide ions having a targeted m/z ratio may be further fragmented and analyzed in a second MS analyzer. There are several types of MS/MS systems, some of which are described further below.

"Multiple reaction monitoring" or "MRM" mass spectrometry is a method of detecting analytes in a complex sample by tandem MS, for example, using a triple quadrupole MS instrument.

An "internal standard" refers to a molecule added to a sample for detection, for instance, in a known amount or concentration, to serve as a standard against which to determine the presence or quantitate the amount or concentration of analyte in the sample. In some embodiments, an internal standard is a molecule that is identical to or similar to an analyte but for presence of a heavy isotope label.

The term "marker" or "biomarker" as used herein refers to an indicator, e.g., predictive, diagnostic, and/or prognostic, which can be detected in a sample. The marker or biomarker may be a protein or polypeptide or nucleic acid molecule as well as a lipid or glycolipid or a drug or drug metabolite. The biomarker may serve as an indicator of the state of a sample or of an organism or subject that a sample is obtained from, such as an indicator of a disease or disorder, of the presence of a particular protein or nucleic acid or lipid, of the presence of a drug or drug metabolite, of the potential prognosis of a disease or disorder, of the potential responsiveness to a drug, and the like, depending upon the purpose of the assay.

The term "quantitation" or "quantitate" means herein to determine numerically the level or amount or number or concentration of an analyte in the sample.

The term "affinity-based capture," as used herein, refers to a process whereby an analyte is isolated in a sample by exposing analyte to a molecule to which it has affinity, such as a ligand or antigen, and separating analyte bound to the ligand or antigen or other molecule to which the analyte has affinity from the rest of the sample. By isolating the analyte in such a process, the analyte can be enriched, concentration and/or removed from contaminating molecules before liquid chromatography, for example.

The term "antibody" herein is used in the broadest sense and encompasses various antibody structures, including but not limited to monoclonal antibodies, polyclonal antibodies, multispecific antibodies (e.g., bispecific antibodies), nanobodies, diabodies, and antigen binding fragments such as Fv, scFv, Fab, (Fab')$_2$, and the like, so long as they exhibit antibody-antigen-binding activity.

The terms "polypeptide" and "protein" are used interchangeably and refer to a polymer of amino acid residues. Such polymers of amino acid residues may contain natural and/or non-natural amino acid residues, and include, but are not limited to, peptides, oligopeptides, dimers, trimers, and multimers of amino acid residues. The terms also include polymers of amino acids that have modifications such as, for example, glycosylation, sialylation, and the like, or that are complexed with other molecules. Protein biomarkers herein include, for example, native and heterologous proteins such as proteins enriched in disease or mutated in disease cells, such as oncogenic proteins, bacterial proteins, viral proteins, and the like, as well as protein drugs and protein drug metabolites.

A "peptide" herein, particularly one that may serve as an analyte or internal standard, is a relatively short polymer of amino acids, such as on the order of 4 to 50 amino acids.

The term "nucleic acid molecule" or "polynucleotide" includes any compound and/or substance that comprises a polymer of nucleotides. Each nucleotide is composed of a base, specifically a purine- or pyrimidine base (i.e. cytosine (C), guanine (G), adenine (A), thymine (T) or uracil (U)), a sugar (i.e. deoxyribose or ribose), and a phosphate group. Often, the nucleic acid molecule is described by the sequence of bases, whereby said bases represent the primary structure (linear structure) of a nucleic acid molecule. The sequence of bases is typically represented from 5' to 3'. Nucleic acid biomarkers herein include, for example, deoxyribonucleic acid (DNA) including e.g., genomic DNA, mitochondrial DNA, methylated DNA, and the like, and ribonucleic acid (RNA), in particular messenger RNA (mRNA), and other cellular RNA molecules such as small interfering RNA (siRNA), micro RNA (miRNA), non-coding RNAs, as well as heterologous nucleic acids such as viral DNA or RNA or bacterial DNA or RNA, or drugs and metabolites that comprise DNA or RNA.

In general, a "subject" as referred to herein is an individual whose biological sample is to be tested for presence of an analyte. In some embodiments, the subject is a human. However, in some embodiments, the subject may also be another mammal, such as a domestic or livestock species, e.g., dog, cat, rabbit, horse, pig, cow, goat, sheep, etc., or a laboratory animal, such as a mouse or rat. Mammals include, but are not limited to, domesticated animals (e.g., cows, sheep, cats, dogs, and horses), primates (e.g., humans and non-human primates such as monkeys), rabbits, and rodents (e.g., mice and rats), for example.

As used herein, an "automated" or "automatically controlled" process is one that is capable of being run, for example, by a computerized control system with appropriate software, as opposed to a system that requires an active, manual intervention during or between at least one step, such as to move an analyte-containing sample from one part of the system to another. In some embodiments, the process is automated by software that controls the movements or positions of one or more pumps, valves, and/or tees during the course of liquid chromatography methods, which movements or positions, in turn, control the flow of mobile phases and eluates through the chromatography system.

In some embodiments herein, two or more steps or conditions may be "substantially the same." This phrase means that they may vary from each other within the normal range of experimental error and also within the appropriate significant figures.

An "eluate" as used herein refers to material that has passed through and thus eluted from a chromatography column.

A "retention time window" as used herein refers to a pre-determined time period during a liquid chromatography process during which an eluate is collected, such as eluate that is generated in a first dimension liquid chromatography process and that is intended for further separation in a second dimension liquid chromatography process.

II. Methods and Systems

This disclosure relates, for example, to methods and systems for performing a two-dimensional liquid chromatography mass spectrometry (e.g. tandem mass spectrometry) assay to characterize an analyte in a sample. In some embodiments, the method comprises: (a) performing high pH reversed phase liquid chromatography (RPLC) survey scan with detection by mass spectrometry (MS) on the analyte at previously determined concentration in the presence of an internal standard, to determine the peak apex ($T_{apex}$) of the analyte; (b) obtaining an experimental sample comprising the analyte; (c) performing high pH RPLC on the sample of (b); (d) collecting at least a portion of the high pH RPLC eluate of (d) corresponding to $T_{apex}$+/−average peak width of the analyte or internal standard in the survey scan of (a), wherein the at least a portion is optionally collected in a trap column; and (e) performing low pH RPLC on the collected portion of the high pH RPLC eluate of (d) and detecting the analyte by MS.

In some embodiments, the analyte is a peptide. In some embodiments, where the analyte is a peptide, the method comprises: (a) obtaining an experimental sample and performing an affinity-based capture to isolate a protein in the sample; (b) digesting the captured protein with a protease to obtain a peptide analyte for detection; (c) performing high pH reversed phase liquid chromatography (RPLC) survey scan with detection by mass spectrometry (MS) on the peptide analyte at previously determined concentration in the presence of an internal standard peptide, to determine the peak apex ($T_{apex}$) of the analyte; (d) performing high pH RPLC on the digested sample of (b) comprising the peptide analyte; (e) collecting at least a portion of the high pH RPLC eluate of (d) corresponding to $T_{apex}$+/−average peak width of a peptide in the survey scan of (c), wherein the at least a portion is optionally collected in a trap column; and (f) performing low pH RPLC on the collected portion of the high pH RPLC eluate of (e) and detecting the analyte by MS. In other cases, the captured protein is not digested before being subjected to liquid chromatography and instead the captured protein sample is subjected directly to liquid chromatography.

For instance, the working example herein describes a generic reagent, ultra-targeted two-dimensional liquid chromatography-tandem mass spectrometry (2D-LC-MS/MS) method which combines commercially available protein A affinity capture, targeted analyte isolation by 2D-LC, and targeted detection by multiple reaction monitoring (MRM). The method was evaluated using an anti-CD22 monoclonal antibody spiked into monkey and human serum, where lower limits of quantification (LLOQ) of 0.78 ng/mL and 1.56 ng/mL were achieved, respectively. This represents an over 100-fold improvement in assay sensitivity compared to a conventional 1D-LC-MS/MS method. The performance of the method was further confirmed, as described in the working example herein, by analyzing another monoclonal antibody, bevacizumab, as well as a soluble antigen-circulating PD-L1 protein using the method.

The disclosure herein also relates to systems for performing a 2D-LC-MS analysis, optionally where the MS is tandem MS (MS/MS) and optionally where the operation of the system can be controlled automatically. In some embodiments, the system comprises: (a) an injection valve for injecting a sample containing the analyte into the system, wherein the injection valve is connected to a high performance liquid chromatography (HPLC) column and a first dimension pump to control flow of sample and mobile phase through the column; (b) a trap column for collecting at least a pre-determined portion of a first dimension HPLC column eluate for analysis in a second dimension HPLC process; (c) a trap valve for controlling flow path of mobile phases from a first dimension HPLC process to a second dimension HPLC process; (d) a second dimension pump to control flow of mobile phases through a second dimension HPLC column; and (e) a mass spectrometer for analysis of analyte following a second dimension HPLC process.

Unlike earlier methods using two stand-alone HPLC systems, the present systems allow for control of each dimension of the LC process in an integrated manner that can be fully automated, and optionally use a microflow rate in both dimensions of the LC process. In some embodiments, the present methods can be run in a single, integrated 2D-LC system. In some embodiments, that system can be partially or fully automated. For example, mobile phases may be automatically controlled, for example, at microflow rates, for the entire 2D-LC process. The present systems can also be highly targeted to identifying and optionally quantifying an analyte, using a narrow targeting window, which is pre-determined in a survey scan prior to the 2D-LC-MS (e.g. 2D-LC-MS/MS) run. In addition, in some embodiments, optimization of the 2D-LC conditions through use of the survey scan is straightforward and, for example, can be performed in about 1-2 hours, whereas in prior processes that use two stand alone LC systems, optimization of conditions may take considerable time.

The sub-sections below describe exemplary options and details of the methods and systems herein.

III. Exemplary Samples and Analyte Capture Methods

Methods herein are applicable to any type of sample containing or thought to contain an analyte for analysis. In some embodiments, the sample is a biological sample. Examples of biological samples include cells, tissues, organs, bone and fluids. In some embodiments, the sample is a biological fluid sample, such as tears, saliva, lymph fluid, urine, serum, cerebral spinal fluid, pleural effusion, ascites, whole blood, or plasma. A biological sample can be, in some aspects, a complex mixture of multiple components and may contain proteins, carbohydrates, lipids, DNA, RNA, metabolites, small molecules, antigens and/or toxins. Examples of biological samples above are, for instance, biopsy samples. Examples of tissue samples include, for instance, fresh or frozen tissue samples as well as fixed, paraffin-embedded (FPET) samples taken from any biological tissue or organ.

In some embodiments, the sample is not treated to isolate (i.e., enrich or concentrate) the analyte prior to liquid chromatography. In other embodiments, the sample is treated to isolate analyte prior to liquid chromatography. Thus, in some embodiments, the sample is used directly without any processing steps. In other embodiments, the sample is first treated before use in the methods herein, such as to remove large particulates by centrifugation or filtration, or to lyse cellular material. In the case of a tissue sample, the sample may also be treated to homogenize the sample, lyse cells, and/or to extract components from the sample that may contain the analyte, such as proteins or nucleic acids and the like. Extraction or filtration or other such methods may be used, at least in part, to enrich or concentrate an analyte from the sample prior to the methods herein. In some embodiments, the method includes treating the sample to isolate an analyte before performing liquid chromatography. In some cases, an affinity-based capture process can be used to isolate an analyte. In other cases, other methods could be used, such as size exclusion chromatography or ion exchange chromatography processes, for example.

A variety of affinity-based capture methods may be performed, for example. In some embodiments, an analyte can be captured, and therefore isolated, by attachment to particles coated with a binding partner, such as a ligand or antigen. Examples of particles used include glass, plastic, polystyrene and agarose. The particles may be fabricated into, for example, plates, beads, columns, plates, matrices, gels and resins. In some embodiments, an analyte can be captured with a bead suspension, for example using magnetic beads. In some embodiments, an analyte can be captured with an immobilized affinity matrix. In some embodiments, an analyte can be captured using chromatography columns or spin columns.

In some embodiments, the particles are coated with a ligand for the analyte, such as a protein, peptide, antibody, antigen, or small molecule ligand or cofactor. Examples include streptavidin, glutathione, concanavalin A, biotin, protein A, protein G, or a protein A and G chimera. In some embodiments, where the analyte is an antibody, the particles can be coated with protein A, protein G and or a protein A and G chimera. In some embodiments, the protein A, protein G and or a protein A and G chimera-coated particles are magnetic beads. In some embodiments, the protein A, protein G and or a protein A and G chimera-coated particles are immobilized in matrices, chromatography columns or spin columns. In some embodiments, where the analyte is a nucleic acid, for example, a particle for its capture can be treated with a primer comprising a complementary sequence.

The methods herein may be applied to a variety of analytes. In some embodiments, methods herein can be used to determine levels of two or more different analytes in a sample, or ratios of different analytes in a sample. For example, a capture method may be used that captures more than one analyte, such as similar proteins or modified and unmodified analytes. Or a sample may be split and different analytes captured using different capture particles or different capture methods and then each may be analyzed according to the 2D-LC-MS methods herein. In some cases, methods herein may be to determine the levels of similar analytes, such as a modified and unmodified protein or nucleic acid or drug or other analyte in a sample, such as an alkylated and nonalkylated analyte, a drug and its related metabolite product, a glycosylated and nonglycosylated protein or peptide analyte, or a methylated and nonmethylated stretch of nucleic acid or the total sum of a class of analytes. In some embodiments, methods here in allow for determination of ratios of modified and unmodified analytes or of two similar analytes in a sample. Obtaining multiple measurements in different samples obtained as conditions change, for example, also allows for tracking of changes in the degree of a particular modification over the course of the change of conditions. For example, in some embodiments where analyte capture is used to obtain analytes prior to 2D-MS analysis, a capture method may be used that captures both an unmodified and a modified analyte, thus allowing the amounts of both and their relative levels to be determined as part of the analysis.

IV. Enzymatic Digestion

In some embodiments, when the analyte to be detected is a relatively large molecule such as a protein or nucleic acid, the molecule is fragmented prior to performing liquid chromatography. Thus, in some embodiments, the sample is treated with one or more enzymes to at least partially digest the analyte so that it is at a sufficient size for the liquid chromatography and mass spectrometry detection. Enzymatic digestion can be performed on a sample following affinity-based capture or other treatments to isolate an analyte. Or it can be performed on a sample that has not been so treated.

If an analyte is a protein, it may be beneficial to digest the protein into smaller peptide fragments by protease treatment. Example classes of proteases include serine proteases, cysteine proteases, threonine proteases, aspartic proteases, glutamic proteases, metalloproteases and asparagine peptide lyases, for instance. Exemplary proteases that could be used herein include trypsin, endoproteinase LysC, endoproteinase ArgC, staph aureus V8, endoproteinase GluC, chymotrypsin, TEV protease, endopeptidase K, subtilisin, subtilisin A, Alcalase®, Maxatase®, Savinase®, Esperase®, proteinase K, thermolabile proteinase K, Trypsin-ultra™, α-lytic protease, endoproteinase AspN, endoproteinase LysC, endoproteinase Arg-C, elastase, thermolysin, pepsin, pepsinogen, Factor Xa protease, clostripain, carboxypeptidase A, carboxypeptidase B, carboxypeptidase Y, acylamino-acid release enzyme, pyroglutamate aminopeptidase, enterokinase, and papain.

Non-peptide analytes can also be at least partially digested by enzymes, if needed, in order to generate molecules of appropriate size for detection. For example, nucleic acids could be treated with nucleases, such as restriction endonucleases, to cut the nucleic acids into suitable-sized fragments for separation and mass spectrometry detection.

In some embodiments, enzymatic digestion is carried out at elevated temperatures, depending upon the efficiency of the enzyme. In some embodiments, enzymatic digestion is carried out following isolation of an analyte by affinity capture. In some embodiments, enzymatic digestion is carried out before removing affinity capture particles from the sample. In some embodiments, it is carried out after removing affinity capture particles from the sample.

V. Survey Scan

In some embodiments, a survey scan is incorporated into the methods described herein, for example, to determine in advance a retention time window of an analyte of interest and/or for an internal standard during a first dimension liquid chromatography process. In some embodiments, the survey scan is run using the identical type of sample and first dimension LC conditions as in the first dimension of the full 2D-LC process, i.e., using the same column, mobile phases, and flow rate and the same mass spectrometry detection equipment and method. This way the retention time window determined in the survey scan will more accurately reflect the time window during which the analyte to be analyzed is being eluted from the first dimension LC column.

In some aspects, a survey scan can be used to determine the retention time window and also the peak width for an analyte, and/or for an internal standard. For example, the survey scan may comprise running a planned first dimension liquid chromatography process followed by the intended mass spectrometry analysis on a sample comprising analyte spiked with an internal standard and/or on a sample comprising an internal standard for the analyte and determining a retention time window for the process. In some embodiments, the survey scan also comprises determining a $T_{apex}$ for the analyte and/or internal standard, where the $T_{apex}$ is the retention time for the peak apex (i.e. the highest point of the peak) of the analyte and/or internal standard peak. In some embodiments, a survey scan can be used to determine an average peak width (PW) for the analyte and/or internal standard peak in the sample as a means of defining a portion of a first dimension LC process eluate (corresponding to a retention time window or range) to be transferred to a second dimension LC process for further separation. In some embodiments, for example, where the analyte is a peptide, an average peak with for peptides in the sample more generally may also be used to define a retention time window to transfer from the first dimension to the second dimension.

In some embodiments, a survey scan is repeated several times in order to improve accuracy, for example. In some embodiments, the survey scan is run at least 3 times, such as 4 times or 5 times. In some such cases, the $T_{apex}$ and PW, for example, can be determined from, for example, the average or median values for the different scans. Further, in some embodiments, the PW is an average of the peak widths of more than one peak in the sample, such as the analyte and/or internal standard and/or other similar molecules. Thus, in some embodiments, the PW is the average of the peak width of peptides in the sample as detected in the survey scan.

In some embodiments, once an appropriate retention time window is obtained for the analyte in the survey scan, the 2D-LC process may be run so that this window is directly transferred for a second dimension LC separation with no mass spectrometry detection occurring between the first and the second dimension. This allows, for example in some embodiments, for the 2D-LC process to be automatically controlled, for example, in a system that allows for eluate from a first dimension separation at the appropriate retention time range to be automatically transferred to a second dimension LC process while the remaining first dimension eluate is discarded as waste.

In some embodiments, the retention time window that is determined during the survey scan is equal to $T_{apex}$ plus or minus a multiple of the PW, where $T_{apex}$ represents the retention time at the peak apex of the analyte or internal standard and PW represents the peak width of the analyte or internal standard. In some embodiments, the survey scan is used to identify a retention window that is equal to $T_{apex}$+/−0.5 PW to 2 PW, or $T_{apex}$+/−1 PW to 2 PW, or $T_{apex}$+/−0.5 PW, 1 PW, 1.5 PW or 2 PW. In some embodiments, the survey scan is used to identify a retention window that is equal to $T_{apex}$+/−1 PW. For example, if the peak width of a peptide is 0.3 min, the retention time window equal to $T_{apex}$+/−1 PW would be $T_{apex}$+/−0.3 min. For example, if the window is equal to $T_{apex}$+/−1 PW and if the peak width of a peptide is 0.2 min, the retention time window would be $T_{apex}$+/−0.2 min.

In some embodiments, the peak width of an analyte is 0.05 min to 1 min, such as 0.05-0.1 min, 0.1-0.15 min, 0.15-0.2 min, 0.2-0.25 min, 0.25-0.3 min, 0.35-0.4 min, 0.4-0.45 min, 0.45-0.5 min, 0.5-0.55 min, 0.55-0.6 min, 0.65-0.7 min, 0.7-0.75 min, 0.75-0.8 min, 0.8-0.85 min, 0.85-0.9 min, 0.9-0.95 min or 0.95-1 min at a flow rate of 7-10 μL/min, depending on the analyte, mobile phases, and column used, for example. In some embodiments, depending on the PW, the retention time window is a window that corresponds to from $T_{apex}$+/−0.2 min to $T_{apex}$+/−0.5 min at a flow rate of 8 μL/min in a C18 column. In some embodiments, the retention time window corresponds to $T_{apex}$+/−0.4 minutes at a flow rate of 8 μl/min in a C18 column. In some embodiments, the retention time window corresponds to $T_{apex}$+/−0.3 minutes at a flow rate of 8 μl/min in a C18 column. In some embodiments, the retention time window corresponds to $T_{apex}$+/−0.25 minutes at a flow rate of 8 μl/min in a C18 column. In some embodiments, the retention time window corresponds to $T_{apex}$+/−0.2 minutes at a flow rate of 8 μl/min in a C18 column. In some embodiments, the retention time window corresponds to $T_{apex}$+/−0.2 to $T_{apex}$+/−0.5 minutes at a flow rate of 8 μl/min in a C18 column. In some embodiments, the retention time window corresponds to $T_{apex}$+/−0.2 to $T_{apex}$+/−0.4 minutes at a flow rate of 8 μl/min in a C18 column. In some embodiments, the retention time window corresponds to $T_{apex}$+/−0.2 to $T_{apex}$+/−0.3 minutes at a flow rate of 8 μl/min in a C18 column. In some embodiments, the retention time window corresponds to $T_{apex}$+/−0.3 to $T_{apex}$+/−0.5 minutes at a flow rate of 8 μl/min in a C18 column. In some embodiments, the retention time window corresponds to $T_{apex}$+/−0.3 to $T_{apex}$+/−0.4 minutes at a flow rate of 8 μl/min in a C18 column. In some embodiments, the retention time window corresponds to $T_{apex}$+/−0.25 to $T_{apex}$+/−0.30 minutes at a flow rate of 8 μl/min in a C18 column.

In any of the above cases, a recited retention time window that "corresponds to" the retention time window at a flow rate of 8 μl/min in a C18 column is the retention time window that would be determined if the survey scan were run at 8 μl/min in a C18 column. In other words, the present methods are compatible with a variety of flow rates and columns, depending on the analyte to be detected. But, merely as a means of comparison, a retention time window that corresponds to a particular $T_{apex}$+/−X minutes at a flow rate of 8 μl/min in a C18 column is one that is equivalent to the particular $T_{apex}$+/−X minutes if the survey scan had been conducted at a flow rate of 8 μl/min in a C18 column.

In some embodiments, the survey scan is performed at a microflow rate, which generally may correspond to a flow rate of between 2 and 100 µL/min. In some embodiments, the survey scan is performed at a flow rate of 4-10 µL/min, 5-10 µL/min, 6-9 µL/min, 7-10 µL/min, 6-8 µL/min, 5 µL/min, 6 µL/min, 7 µL/min, 8 µL/min, 9 µL/min, or 10 µL/min. In some embodiments, the flow rate chosen is identical to, or substantially the same as, that used for the first dimension separation described below.

In some embodiments, the survey scan is a high pH LC process, such as a high pH RPLC process. In some embodiments, the high pH RPLC is performed at a pH between 8 and 10, between 8 and 9, between 9 and 10, or at pH 8.0, pH 8.5, pH 9.0, pH 9.5, or pH 10. In some embodiments, the high pH RPLC is performed at a pH between 8 and 10, between 8 and 9, between 9 and 10, or at pH 8.0, pH 8.5, pH 9.0, pH 9.5, or pH 10, with a mobile phase A comprising ammonium formate and a mobile phase B comprising ammonium formate and acetonitrile. In some embodiments, the pH is identical to, or substantially the same as, that for the first dimension separation described below.

In some embodiments, mobile phases and column for the survey scan are chosen to be identical to those of the first dimension LC process as described below.

In some embodiments, mobile phases, pH, column, and flow rate for the survey scan are identical to, or substantially the same as, those used for the first dimension LC process. In general, temperature and pressure for the survey scan and the first dimension LC process are also expected to be the same, or substantially the same.

VI. 2D-LC-MS Process Steps

Following a survey scan, a two-dimensional LC process can be run. Generally, as noted above, the first dimension of the process will be run under the same conditions as for the survey scan so that the retention time window identified in the survey scan will as accurately as possible predict when the analyte will elute during the first dimension of the LC process. Thus, for example, in many embodiments, the survey scan and first dimension LC may use the same flow rate, mobile phases, and/or same column, and will also be run at the same temperature and pressure.

In some embodiments, the LC separation is an RPLC process. In RPLC, compounds that are more polar tend to have shorter retention times than their hydrophobic or nonpolar compounds. When ionizable analytes are present, dramatic changes in retention can take place when the mobile phase pH is altered. Thus, adjustment of buffer pH can have a significant effect on liquid chromatography separations. In some embodiments, each dimension is conducted at a particular, relatively constant pH. In some embodiments, a high pH buffer is used in the first dimension and a low pH buffer are used in the second dimension. Although, the present methods are also compatible with other means of separation, depending on the analyte, such as, separation based on salt concentration rather than pH or separation via a pH gradient in one or both dimensions.

In some embodiments, the first dimension LC is a high pH LC process, such as a high pH RPLC process. In some embodiments, the high pH RPLC is performed at a pH between 8 and 10, between 8 and 9, between 9 and 10, or at pH 8.0, pH 8.5, pH 9.0, pH 9.5, or pH 10. In some embodiments, the mobile phases comprise a salt-free or a low-salt basic solution, for example, comprising a base in water, and a mixture of the basic solution in an organic solvent. In some embodiments, ammonium formate is used as the base. In some embodiments, the organic solvent is acetonitrile. For example, in some embodiments, the mobile phase A comprises a basic solution and mobile phase B comprises the basic solution in an organic such as acetonitrile. In some embodiments mobile phase B comprises, for example 80% to 90% organic and 10% to 20% of the solution of mobile phase A. In some embodiments, the high pH RPLC is performed at a pH between 8 and 10, between 8 and 9, between 9 and 10, or at pH 8.0, pH 8.5, pH 9.0, pH 9.5, or pH 10, with a mobile phase A comprising ammonium formate and a mobile phase B comprising ammonium formate and acetonitrile. In some embodiments, the mobile phase is 10 mM ammonium formate, pH 9.5, and 0-100% acetonitrile.

In some aspects, analyte retention is influenced by the amount of organic solvent that is present in the buffer. In various embodiments, the buffer has 0-100% organic solvent, such as acetonitrile. In some embodiments, an acetonitrile concentration gradient is applied wherein the gradient may be a linear, step, increasing and/or decreasing gradient.

In some embodiments, the high pH process uses a mobile phase gradient rather than an isocratic mobile phase separation. In some embodiments, the gradient is a continuously changing gradient rather than a step-wise changing gradient. For example, a continuous gradient can be automatically controlled. Thus, for example, mobile phases A and B can be mixed at different percentages as the process proceeds. This mixing may be controlled automatically, for example, in some embodiments. In some embodiments, the process uses a high pH RPLC buffer gradient corresponding to a range of from 0.1% to 90% of buffer B (basic solution with organic, e.g. ammonium formate solution and acetonitrile) with time, or from 3% to 90% of buffer B with time. In some embodiments, mobile phase A comprises 10 mM ammonium formate and mobile phase B comprises 10 mM ammonium formate in acetonitrile. In some such embodiments, mobile phase A comprises 10 mM ammonium formate, pH 9.5 and mobile phase B is 10 mM ammonium formate in 90% acetonitrile, pH 9.5.

In particular embodiments, the following gradient is used, for example at a microflow rate: 3% B (0-3 min), 3-10% B (3-4 min), 10-35% B (4-14 min), 35-90% B (14-14.5 min), 90% B (14.5-15.5 min), 90-35% B (15.5-15.6 min), 35% B (15.6-17.5 min), 35-3% B (17.5-17.6 min), 3% B (17.6-20 min). In some embodiments, mobile phase A comprises 10 mM ammonium formate and mobile phase B is 10 mM ammonium formate in 90% acetonitrile. In some such embodiments, mobile phase A comprises 10 mM ammonium formate, pH 9.5 and mobile phase B is 10 mM ammonium formate in 90% acetonitrile, pH 9.5.

In some embodiments, based on the survey scan, the first dimension LC is run such that the process comprises collecting at least a portion of the eluate corresponding to $T_{apex}+/-0.5$ PW to 2 PW, or $T_{apex}+/-1$ PW to 2 PW, or $T_{apex}+/-0.5$ PW, 1 PW, 1.5 PW or 2 PW of the analyte or internal standard as obtained in the survey scan. In some embodiments, the first dimension LC is run such that the process comprises collecting at least a portion of the eluate corresponding to $T_{apex}+/-1$ PW.

In some embodiments, the peak width of an analyte is 0.05 min to 1 min, such as 0.05-0.1 min, 0.1-0.15 min, 0.15-0.2 min, 0.2-0.25 min, 0.25-0.3 min, 0.35-0.4 min, 0.4-0.45 min, 0.45-0.5 min, 0.5-0.55 min, 0.55-0.6 min, 0.65-0.7 min, 0.7-0.75 min, 0.75-0.8 min, 0.8-0.85 min, 0.85-0.9 min, 0.9-0.95 min or 0.95-1 min at a flow rate of 7-10 µL/min, depending on the analyte, mobile phases, and column used, for example. In some embodiments, depending on the PW, the retention time window is a window that corresponds to from $T_{apex}+/-0.2$ min to $T_{apex}+/-0.5$ min at a flow rate of 8 µL/min in a C18 column. In some embodiments, the retention time window corresponds to $T_{apex}+/-0.4$ minutes at a flow rate of 8 µl/min in a C18 column. In some embodiments, the retention time window corresponds to $T_{apex}+/-0.3$ minutes at a flow rate of 8 µl/min in a C18 column. In some embodiments, the retention time window corresponds to $T_{apex}+/-0.25$ minutes at a flow rate of 8 µl/min in a C18 column. In some embodiments, the retention time window corresponds to $T_{apex}+/-0.2$ minutes at a flow rate of 8 µl/min in a C18 column. In some embodiments, the retention time window corresponds to $T_{apex}+/-0.2$ to $T_{apex}+/-0.5$ minutes at a flow rate of 8 µl/min in a C18 column. In some embodiments, the retention time window corresponds to $T_{apex}+/-0.2$ to $T_{apex}+/-0.4$ minutes at a flow rate of 8 µl/min in a C18 column. In some embodiments, the retention time window corresponds to $T_{apex}+/-0.2$ to $T_{apex}+/-0.3$ minutes at a flow rate of 8 µl/min in a C18 column. In some embodiments, the retention time window corresponds to $T_{apex}+/-0.3$ to $T_{apex}+/-0.5$ minutes at a flow rate of 8 µl/min in a C18 column. In some embodiments, the retention time window corresponds to $T_{apex}+/-0.3$ to $T_{apex}+/-0.4$ minutes at a flow rate of 8 µl/min in a C18 column. In some embodiments, the retention time window corresponds to $T_{apex}+/-0.25$ to $T_{apex}+/-0.30$ minutes at a flow rate of 8 µl/min in a C18 column.

Accordingly, as the $T_{apex}+/-0.5$ PW to 2 PW may be a rather short time, on the order of less than a minute, in some embodiments, the method is controlled automatically so that the eluate flow is collected only during this short time window but otherwise allowed to go to a waste container.

In some embodiments, the first dimension is performed at a microflow rate of, for example from 2 to 100 µL/min, such as a flow rate of 4-10 µL/min, 5-10 µL/min, 6-9 µL/min, 7-10 µL/min, 6-8 µL/min, 5 µL/min, 6 µL/min, 7 µL/min, 8 µL/min, 9 µL/min, or 10 µL/min. In some embodiments, the same flow rate is used for the survey scan and the first dimension LC process.

Many types of reversed phase columns may be used in 2D-LC, with a hydrophobic stationary phase. Examples of columns include silica-based columns and PS-DVB resin columns. In some embodiments, the first dimension separation is performed with a C18 column or a C4 or C8 column. In some embodiments, a C18 column is used. In some embodiments, the column used for the first dimension separation is the same as that used for the survey scan.

In some embodiments, the portion of the first dimension eluate to be collected for the second dimension, previously identified in the survey scan, is collected in a trap column or another suitable device, which can serve to hold and separate it from the unwanted portion of the first dimension eluate. The collected portion of the eluate can then be mixed with mobile phase for a second dimension LC separation process. At the same time, the remainder of the first dimension eluate may be, for example, collected in a waste container. In some embodiments, a tee and/or valve or similar device may be incorporated into the system to control the eluate being collected from the column so that the desired portion containing the analyte, identified from the survey scan, is collected for second dimension analysis while the remainder of the eluate is transferred to waste. In some embodiments, the survey scan may be used to allow a system running the method to automatically detect the beginning and end of the retention time window identified in the survey scan as containing the analyte so that the eluate flow automatically moves from waste to collection (e.g. in a trap column or filter or similar device).

In some embodiments, the collected portion of the eluate from the first dimension is re-equilibrated for further separation in the second dimension. For example, the collected analyte-containing portion may be mixed with a second dimension mobile phase for further separation in the second dimension. This buffer exchange may be conducted, for example, using a trap column, or filter, or other means capable of holding the analyte while exchanging the buffer.

In some embodiments, the second dimension LC is a low pH LC, such as a low pH RPLC. Low pH LC, in some embodiments, may be performed at a pH between 2 and 6, between 2 and 4.5, between 2 and 4, between 2 and 3, between 2 and 2.5, between 3 and 4, or at pH 2.0, pH 2.5, pH 3.0, pH 3.5, pH 4.0, pH 4.5, pH 5, or pH 6. In some embodiments, the pH may be between 2 and 2.5, such as pH 2.0, pH 2.1, pH 2.2, pH 2.3, pH 2.4, and pH 2.5. In some embodiments, low pH RPLC may be performed with a mobile phase A comprising formic acid and a mobile phase B comprising formic acid and an organic solvent such as acetonitrile or TFA. In some embodiments, mobile phase A may comprise 0.1% (v/v) formic acid in water and mobile phase B may comprise 10% of 0.1% formic acid (v/v) in 90% of an organic solvent such as acetonitrile. In some such embodiments, the pH of mobile phase A may be 2.4.

In some embodiments, a buffer gradient, such as a continuous buffer gradient, is used for the second dimension LC process, as opposed to isocratic or step-wise changes in mobile phase. In some embodiments, a low pH RPLC buffer gradient for use with a microflow rate is as follows: 0.1% B (0-11 min), 0.1-10% B (11-11.5 min), 10-35% B (11.5-15.5 min), 35-90% B (15.5-15.6 min), 90% B (15.6-17.5 min), 90-0.1% B (17.5-17.6 min), 0.1% B (17.6-20 min). In some such embodiments, mobile phase A is 0.1% (v/v) formic acid in water and mobile phase B is 0.1% formic acid (v/v) in acetonitrile.

In some embodiments, the second dimension is performed at a microflow rate of, for example from 2 to 100 µL/min, such as a flow rate of 4-10 µL/min, 5-10 µL/min, 6-9 µL/min, 7-10 µL/min, 6-8 µL/min, 5 µL/min, 6 µL/min, 7 µL/min, 8 µL/min, 9 µL/min, or 10 µL/min. In some embodiments, both the first dimension and the second dimension LC separations are both performed at a microflow rate. In some embodiments, the same flow rate is used for the second dimension LC process as for the first dimension LC process. In other embodiments, the flow rate of the second dimension is different from that of the first dimension.

Many types of reversed phase columns may be used in 2D-LC, with a hydrophobic stationary phase. Examples of columns include silica-based columns and PS-DVB resin columns. In some embodiments, the second dimension separation is performed with a C18 column or a C4 or C8 column. In some embodiments, a C18 column is used.

Following the second dimension separation, analyte may be collected for mass spectrometry analysis. In some embodiments, the MS is tandem MS ("MS/MS"). There are a variety of MS options. In some embodiments, the MS instrument comprises at least 2 quadrupole analyzers. In some embodiments, the MS instrument comprises at least 3 quadrupole analyzers. In some embodiments, the MS is multiple reaction monitoring (MRM), single ion monitoring (SIM), triple stage quadrupole (TSQ), quadrupole/time of flight (QTOF), quadrupole linear ion trap (QTRAP), hybrid ion trap/FTMS, time of flight/time of flight (TOF/TOF), or tandem in time MS/MS. In some embodiments, the MS is MRM mass spectrometry. In some embodiments, the MS is SIM mass spectrometry.

In some embodiments, a 2D-LC-MS process is fully automated, or is carried out using a system that is capable of being fully controlled automatically so that the process can be fully automated from the beginning of the first dimension separation through to the MS analysis, for example. Systems according to the disclosure are described, for example, in the next section and further illustrated, for example, in FIGS. 2 and 3.

In some embodiments, the methods disclosed herein enable at least a 30-fold improvement in sensitivity compared to a microflow 1D-LC-MS/MS process, e.g., 30-100-fold, 30-40 fold, 40-50 fold, 50-60 fold, 60-70 fold, 70-80 fold, 80-90 fold, or 90-100 fold. In some embodiments, methods disclosed herein enable at least a 100-fold improvement in sensitivity compared to conventional analytical flow 1D-LC-MS/MS, e.g., 100-150 fold, 100-120 fold, 120-140 fold, or 130-150 fold. In some embodiments, methods herein can quantify analytes present in tissue samples at concentrations of, for example, less than 10 fmol/μg total protein, less than 1 fmol/μg total protein, 1-10 fmol/μg total protein, less than 0.1 fmol/μg total protein, 0.1-1 fmol/μg total protein, or between 0.01 and 0.1 fmol/μg total protein. In some embodiments, the greatest improvements in sensitivity in tissue samples occurred with analytes at, for example, 0.01-1 fmol/μg total protein, such as at 0.05 fmol/μg total protein. In fluid samples, specific analytes could be detected at concentrations of less than 10 ng/mL, less than 1 ng/mL, less than 100 pg/mL, or less than 10 pg/mL, for example, such as 1-10 ng/mL, 100 pg/mL to 1 ng/mL, or 10-100 pg/mL. In fluid samples, greatest improvements in sensitivity in fluid samples occurred with analytes at, for example, 10 pg/mL to 1 ng/mL, or 50-200 pg/mL or 100 pg/mL.

VII. 2D-LC-MS Systems

The present disclosure also relates to systems for performing methods described herein. In some embodiments, the methods herein may be performed using an integrated 2D-LC system linked to a mass spectrometer, for example. In some embodiments, such systems may be fully automatically controlled once a survey scan process is performed to determine an appropriate retention time window for collection of analyte between a first dimension and a second dimension LC process. In general, a 2D-LC system may comprise two pumps, a first dimension column and a second dimension column, and appropriate tubing and valves to allow flow of analyte and mobile phases through the system. In some embodiments, two separate pumps can be used to control sample flow and/or mobile phase flow. The pumps may be used to facilitate mobile phase gradient for the first and second dimensions of the 2D-LC system. In some embodiments, the system comprises a first dimension pump that controls flow of analyte and mobile phase through the first dimension column and a second dimension pump that controls flow of analyte and mobile phase through the second dimension column.

In some embodiments, the system is connected to one or more valves, which may include injection valves, switching valves, ports, ferrules, nuts and autosamplers. Valves typically come with a number of ports and positions (e.g., 6 ports and 2 positions) and are compatible with a variety of syringes, sample loops and sample pumps. In some embodiments, the system comprises an injection valve that enables sample loading onto the first dimension column.

In some embodiments, the system comprises a trap column or other means that serves to hold the analyte between the first and second dimension separations. In such embodiments, the trap column is situated between the first dimension column and the second dimension column. In some embodiments, the trap column is able to collect a portion of the first dimension column's eluate for analysis in the second dimension. In some embodiments, the trap valve controls the flow of analyte from a first dimension process to a second dimension process. In some embodiments, the eluate provided to the trap column comprises the portion of the first dimension eluate defined by the retention time window determined during a survey scan. In some embodiments, the flow of first dimension eluate into a trap column or other means to hold the analyte between dimensions is controlled via a trap valve, (e.g. with several ports and positions) and/or a tee device to open and close the appropriate tubing for flow of analyte-containing eluate into the trap column.

The 2D-LC system may be connected to a mass spectrometer or a tandem mass spectrometer for analysis of analyte following a second dimension LC process. In some embodiments, the MS is tandem MS ("MS/MS"). There are a variety of MS options. In some embodiments, the MS instrument comprises at least 2 quadrupole analyzers. In some embodiments, the MS instrument comprises at least 3 quadrupole analyzers. In some embodiments, the MS is multiple reaction monitoring (MRM), single ion monitoring (SIM), triple stage quadrupole (TSQ), quadrupole/time of flight (QTOF), quadrupole linear ion trap (QTRAP), hybrid ion trap/FTMS, time of flight/time of flight (TOF/TOF), or tandem in time MS/MS. In some embodiments, the MS is MRM mass spectrometry. In some embodiments, the MS is SIM mass spectrometry. Examples of tandem mass spectrometers include triple stage quadrupole (QQQ or triple quad), quadrupole/time-of-flight (QTOF), quadrupole-linear ion trap hybrid, and time-of-flight-time-of-flight instruments.

In some embodiments, the system is set up to use microflow rates of, for example from 2 to 100 μL/min, such as a flow rate of 4-10 μL/min, 5-10 μL/min, 6-9 μL/min, 7-10 μL/min, 6-8 μL/min, 5 μL/min, 6 μL/min, 7 μL/min, 8 μL/min, 9 μL/min, or 10 μL/min. In some embodiments, the LC separations are performed with a C18 column or a C4 or C8 column. In some embodiments, a C18 column is used.

Figure 3:
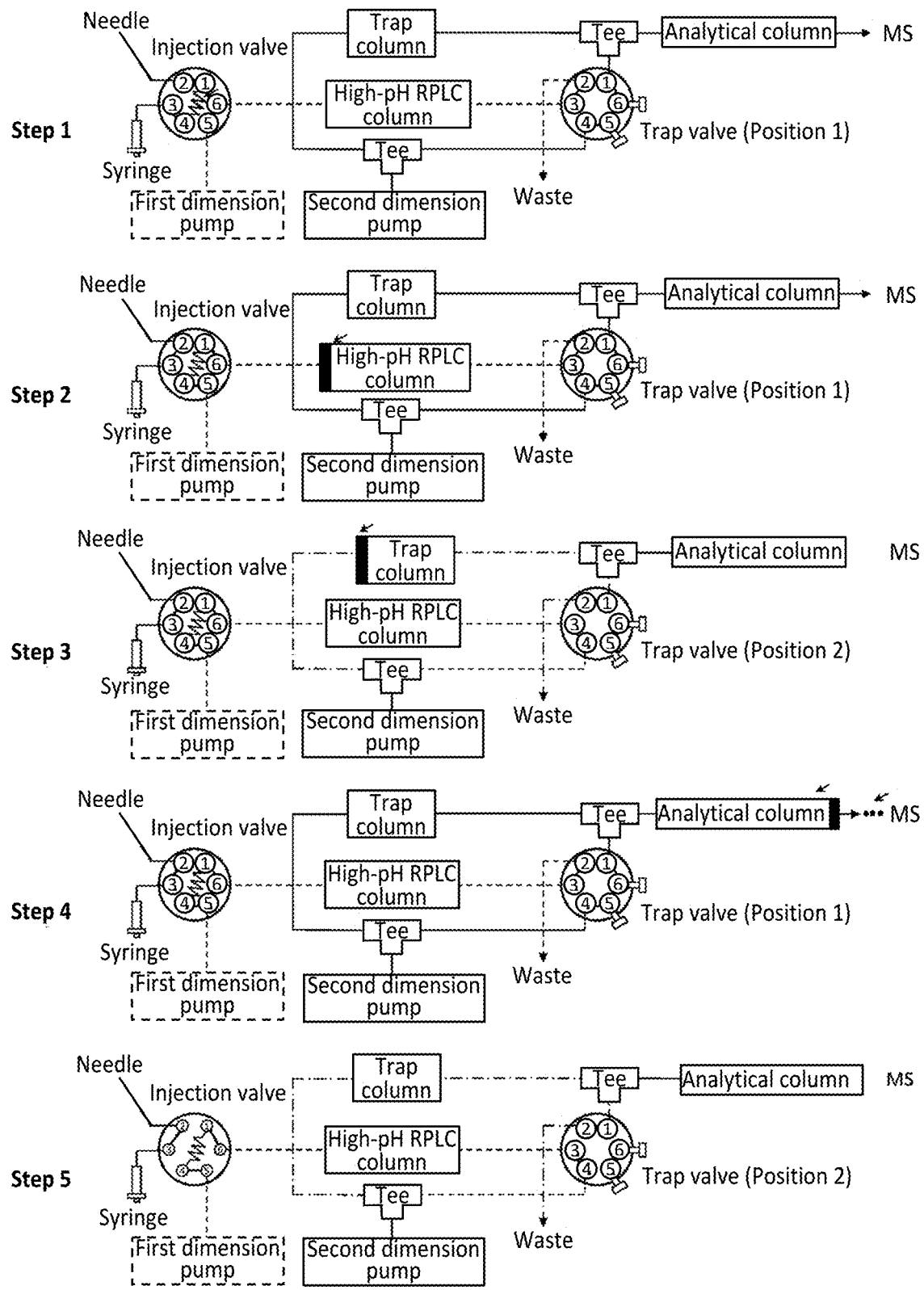
FIG. 3 shows the schematic workflow of ultra-targeted 2D-LC-MS/MS with a targeted-2D-with-dilution configuration. In the figure, simple dashed lines show the flow path of the high-pH mobile phase, solid lines show the flow path of low-pH mobile phase, composite dotted and dashed lines show the flow path of a mixture of the high- and low-pH mobile phases, while arrows show the location of the analyte. The method consists of five steps: (Step 1) load sample and equilibrate columns; (Step 2) inject sample and separate the analyte from matrix molecules using a linear high-pH RPLC gradient; (Step 3) transfer analyte fraction/portion within a 0.6-min retention time window ($T_{apex}$+/−0.3 min) onto the trap column, and dilute the fraction/portion with the second-dimension low-pH mobile phase A; (Step 4) elute the analyte through the analytical column using a linear low-pH RPLC gradient for MS analysis, and in the meantime elute matrix molecules from the high-pH RPLC column to waste; (Step 5) clean trap valve, tubings and columns using high organic mobile phases.

An example of a 2D-LC-MS/MS system is shown in FIG. 3, wherein an integrated 2D-LC system is connected to a tandem mass spectrometer. The figure shows 5 steps of an automated 2D-LC process according to the present disclosure that may be performed on an integrated 2D-LC system after an appropriate survey scan has been run. In the first step, the columns are equilibrated and sample comprising the analyte is loaded into the system using an injection valve. In Step 1 of FIG. 3, the analyte-containing sample is transferred from a syringe or other external device into the injection valve. The figure also depicts a first dimension pump for controlling mobile phases during the first dimension separation and a high pH RPLC column for the first dimension LC separation. A line running from the first dimension pump through the high pH RPLC column through to a trap valve and to waste indicates that the eluate from the first dimension LC process can be sent to waste collection until the retention time reaches the window for collection of analyte, as previously determined in a survey scan. Step 2 of the figure shows that the injection valve ports are re-set so that the analyte enters the high pH RPLC column for first dimension separation (see the dark bar on the left end of the column in the figure) and mobile phases and eluate being collected as waste (see the line on the right side of the column going through the trap valve and to waste). Once the retention time window for collection of analyte is reached, in Step 3, the ports of the trap valve are re-set so that the column eluate passes through a tee device (depicted below the high pH column), which tee is also opened to control the flow, and into a trap column (depicted above the high pH column) where the second dimension pump is used to mix eluate collected in the trap column with low pH mobile phase for the second dimension separation. The collected analyte is depicted as a solid bar at the left end of the trap column in Step 3 of the figure. Once the analyte is collected and the retention time window defined by the survey scan ends, the valves may be re-set to collect the remainder of the first dimension eluate as waste (e.g. see the valve positions in Steps 3 and 4). In Step 4 of the figure, a second dimension LC process is run with the aid of the second dimension pump. This process moves the collected analyte in the trap column to a low pH column (analytical column) for further separation. The eluate of this second dimension column may then be transferred to the mass spectrometer for analysis. In Step 5 of the figure, the injection and trap valve positions may be set to equilibrate both columns for a new run.

Systems of this disclosure may also be configured to run a survey scan using only a first dimension LC and the mass spectrometer, so as to determine a retention time window during the first dimension LC when the analyte will elute. In some embodiments, therefore, during the survey scan, a first dimension column may be directly connected to a mass spectrometer in order to run a survey scan, and then re-configured, so that a second dimension column is then connected to the mass spectrometer for running a full 2D-LC process. In some cases, the survey scan may be run by placing the first dimension column at the normal location of the second dimension column so that it directly connects to the mass spectrometer. In other cases, the system can be configured so that the first dimension column in its normal location will directly connect to the mass spectrometer (i.e., its eluate will directly go to the mass spectrometer, bypassing any trap column or second column).

In some embodiments, the systems herein can operate so that all steps of the 2D-LC-MC methods are automatically controlled (see, e.g., the steps depicted in FIG. 3). In some embodiments, the systems herein can operate so that the survey scan is also automatically controlled. In general, automatic control herein means that the pumps, valves, and tees, for example, in the system can be positioned by means of software programming. Automatic control of these pumps, valves, and tees, which control the flow of mobile phases and eluates in the system, in turn, allows the mobile phases of the chromatography steps and the eluates to move through the tubing and columns of the system as appropriate. In some embodiments, the retention time window for collection of the portion of the first dimension eluate that will pass to the second dimension is automatically controlled. In some embodiments, one or more steps of the methods can be performed without automatic control. For example, it is possible to run the methods herein without automatically controlling the movement of the eluate of the completed 2D-LC process into the mass spectrometer. Thus, in some embodiments, the mass spectrometer need not be directly connected to the 2D-LC system, while in other embodiments, it can be directly connected. In some embodiments, the process could be performed on a non-integrated system. In such cases, the first dimension separation can be automatically controlled through to collecting the portion of the first dimension eluate that will be separated in the second dimension, but this portion of the eluate can then be manually injected into a stand alone second dimension system, which is optionally connected to a mass spectrometer. This second dimension system could be separately automatically controlled.

In some embodiments, the systems disclosed herein enable at least a 30-fold improvement in sensitivity compared to a microflow 1D-LC-MS/MS process, e.g., 30-100-fold, 30-40 fold, 40-50 fold, 50-60 fold, 60-70 fold, 70-80 fold, 80-90 fold, or 90-100 fold. In some embodiments, systems disclosed herein enable at least a 100-fold improvement in sensitivity compared to conventional analytical flow 1D-LC-MS/MS, e.g., 100-150 fold, 100-120 fold, 120-140 fold, or 130-150 fold. For example, in tissue samples specific analyte proteins or peptides could be detected at concentrations of less than 10 fmol/µg total protein, less than 1 fmol/µg total protein, 1-10 fmol/µg total protein, less than 0.1 fmol/µg total protein, 0.1-1 fmol/µg total protein, or between 0.01 and 0.1 fmol/µg total protein. In some embodiments, the greatest improvements in sensitivity in tissue samples occurred with analytes at, for example, 0.01-1 fmol/µg total protein, such as at 0.05 fmol/µg total protein. In fluid samples, specific analytes could be detected at concentrations of less than 10 ng/mL, less than 1 ng/mL, less than 100 pg/mL, or less than 10 pg/mL, for example, such as 1-10 ng/mL, 100 pg/mL to 1 ng/mL, or 10-100 pg/mL. In fluid samples, greatest improvements in sensitivity in fluid samples occurred with analytes at, for example, 10 pg/mL to 1 ng/mL, or 50-200 pg/mL or 100 pg/mL.

Methods and systems herein are further illustrated by the following Examples. These Examples are meant only to illustrate potential embodiments and not to limit the inventions in any way.

EXAMPLES

Example 1

This Example describes a fully-automated method to quantify biotherapeutics and soluble targets in serum in the pg/ml range. The method combines the following: (1) a generic and commercially available capture reagent—in this case, protein A, (2) targeted two-dimensional liquid chromatography for analyte isolation (2D-LC), and (3) targeted detection by multiple reaction monitoring (MRM) mass spectrometry.

Materials and Methods

Spike-in experiments: Monoclonal antibodies were spiked into human, monkey or mouse serum with a 2-fold serial dilution at a concentration of 400, 200, 100, 50, 25, 12.5, 6.25, 3.13, 1.56 and 0.78 ng/mL, respectively. For the soluble PD-L1 experiment, an atezolizumab-PD-L1 complex was made by incubating 145 nM of PD-L1 with 2.9 µM of atezolizumab (molar ratio 1:20) at room temperature for 2 hours. Under this condition, PD-L1 is completely bound by atezolizumab. The atezolizumab-PD-L1 complex was then spiked into normal human serum with a 2-fold serial dilution where the molar concentration of PD-L1 was 18, 9, 4.5, 2.25, 1.125, 0.56, 0.28, 0.14 and 0.07 nM, respectively.

Protein A affinity capture and on-bead protein digestion: A 25 µL or 50-µL serum aliquot was transferred to a 96-well plate containing 300 µL of HBS-EP buffer (GE Healthcare). Monoclonal antibodies or antibody-antigen complexes were captured from each sample by incubating with 50 µL of protein A magnetic beads for 1.5 hours at room temperature. The beads were washed with 400 µL of HBS-EP buffer and 400 µL of water, and transferred to a protein LoBind™ plate. The analyte captured by protein A was denatured and reduced by adding 75 µL of 1 mg/mL RapiGest™ SF Surfactant and 10 µL of 100 mM dithiothreitol into each sample and incubating at 60° C. for 1 hour. The analyte was further alkylated by adding 25 µL of 100 mM iodoacetamide and incubating in the dark at room temperature for 30 minutes, followed by on-bead tryptic digestion at 37° C. overnight. The digestion reaction was then quenched by adding 25 µL of 2N HCl solution containing 8 pmol/mL of internal standard peptides. The magnetic beads were removed from each sample and the supernatant was used for LC-MS/MS analysis. A KingFisher™ 96 magnetic particle processor (Thermo Fisher Scientific) was used to mix, wash, gather, and transfer the magnetic beads in the above steps.

High-pH RPLC-MS/MS survey scan: Prior to developing a 2D-LC-MS/MS method, a high-pH RPLC-MS/MS survey scan was performed to determine the retention time of the analyte. Briefly, a 10-µL aliquot of the spike-in sample with the highest concentration of the analyst was analyzed on an ACQUITY UPLC® M-class 2D-LC system. The peptides were separated with a BEH 1.7 µm C18 column (300 µm i.d.×50 mm) at a flow rate of 8 µL/min using a 10-min linear gradient from 10 to 35% of mobile phase B (mobile phase A: 10 mM ammonium formate, pH 9.5; mobile phase B: 10 mM ammonium formate in 90% acetonitrile, pH 9.5). A QTRAP® 6500+ mass spectrometer equipped with an Optiflow® Turbo V ion source was used for monitoring of both the signature peptide of the analyte and the internal standard peptide. The survey scan analysis was repeated 4-5 times until the retention time of the analyte peptide stayed stable. The Analyst 1.7 software was used for data acquisition and retention time determination. The retention time at the peak apex of the analyte was defined as $T_{apex}$.

Targeted 2D-LC-MS/MS: An online 2D-LC method was developed for targeted separation of the analyte from matrix molecules, where high-pH RPLC was used for the first dimension separation and low-pH RPLC was used for the second dimension separation. To achieve targeted separation of the analyte, the fraction or portion within the retention time window $T_{apex}$+/−0.3 min was selectively transferred from the first dimension to the second dimension. The detailed configuration of this targeted 2D-LC-MS/MS method is shown in FIG. 3 and described below. Two sets of binary pumps on the ACQUITY UPLC® M-class 2D-LC system were used to create the LC gradient at the same flow rate of 8 µL/min for high-pH and low-pH RPLC, respectively. For the first dimension high-pH RPLC, the same column, mobile phases and gradient were used as in the survey scan analysis. The detailed high-pH RPLC gradient information was as follows: 3% B (0-3 min), 3-10% B (3-4 min), 10-35% B (4-14 min), 35-90% B (14-14.5 min), 90% B (14.5-15.5 min), 90-35% B (15.5-15.6 min), 35% B (15.6-17.5 min), 35-3% B (17.5-17.6 min), 3% B (17.6-20 min). An HSS T3 1.8 µm C18 column (300 µm i.d.×100 mm) was used for the second dimension separation by low-pH RPLC, where mobile phase A was 0.1% formic acid and mobile phase B was 0.1% formic acid in acetonitrile. The LC gradient was 0.1% B (0-11 min), 0.1-10% B (11-11.5 min), 10-35% B (11.5-15.5 min), 35-90% B (15.5-15.6 min), 90% B (15.6-17.5 min), 90-0.1% B (17.5-17.6 min), 0.1% B (17.6-20 min). The trap valve position was switched to "Position 2" at $T_{apex}$−0.3 min to start transferring the analyte onto a Symmetry 5 µm C18 trap column (180 µm i.d.×20 mm), and switched back to "Position 1" at $T_{apex}$+0.3 min to end analyte transfer. It was switched to "Position 2" again at 16.8 min to thoroughly clean the trap valve, trap column and tubings, and then switched back to "Position 1" at 19 min to equilibration the columns. The above method was used to analyze all the peptides included in this Example, which were relatively hydrophilic and eluted before 11 min during high-pH RPLC separation. For analysis of hydrophobic peptides, a slight modification in the LC gradients was used to ensure the analyte was transferred to the second dimension. The Masslynx™ V4.1 software was used to create the method.

The QTRAP® 6500+ mass spectrometer was operated in positive ionization mode with an Optiflow® Turbo V ion source. The key source parameters were set as follows: Curtain gas flow, 35; Collision gas, medium; Nebulizer gas, 25; Ion spray voltage, 5000 V; Temperature, 300° C. The analyte-dependent ion transitions and quadrupole parameters for all the peptides analyzed in this work are listed in Table 1 below.

TABLE 1

Analyte-dependent parameters for all the peptides analyzed in this work.

| Analyte | Peptide | SEQ ID NO | Dwell Time (ms) | Q1 m/z | Q3 m/z | DP | CE | EP | CXP |
|---|---|---|---|---|---|---|---|---|---|
| anti-CD22 | IYPGDGDTNYSGK | 1 | 60 | 693.81 | 555.74 | 80 | 29 | 10 | 26 |
|  | IYPGDGDTNYSGK* | 2 | 60 | 697.81 | 559.74 | 80 | 29 | 10 | 26 |
|  | LSC*AASGYEFSR | 4 | 60 | 674.29 | 845.38 | 91 | 35 | 10 | 44 |
|  | LSC*AASGYEFSR* | 5 | 60 | 679.29 | 855.38 | 91 | 35 | 10 | 44 |
| Bevacizumab | FTFSLDTSK | 8 | 60 | 523.26 | 797.41 | 61 | 23 | 10 | 24 |
|  | FTFSLDTSK* | 9 | 60 | 527.26 | 805.41 | 61 | 23 | 10 | 24 |
| PD-L1 | LQDAGVYR | 6 | 60 | 461.24 | 680.34 | 75 | 22 | 10 | 35 |
|  | LQDAGVYR* | 7 | 60 | 466.24 | 690.34 | 75 | 22 | 10 | 35 |
| Herceptin | TTPPVLDSDGSFFLYSK | 10 | 60 | 937.46 | 836.42 | 105 | 41 | 10 | 40 |
|  | TTPPVLDSDGSFFLYSK* | 11 | 60 | 941.46 | 840.42 | 105 | 41 | 10 | 40 |

In Table 1, C* represents carboxamidomethyl-modified Cysteine; K* represents Lysine ($^{13}C_6$, $^{15}N_2$); R* represents Arginine ($^{13}C_6$, $^{15}N_4$).

Microflow 1D-LC-MS/MS: The digested samples were analyzed using an ACQUITY UPLC® M-class system coupled online to a QTRAP® 6500+ mass spectrometer (Sciex). The M-class system was equipped with an HSS T3 1.8 µm C18 column (300 µm i.d.×100 mm). Ten microliters of each sample were loaded onto the column and the peptides were separated at a flow rate of 8 µL/min using a 4-min linear gradient from 10 to 35% acetonitrile in 0.1% formic acid. The QTRAP® 6500+ mass spectrometer was operated in the same manner as in the targeted 2D-LC-MS/MS method.

Analytical flow LC-MS/MS: Ten microliters of each sample was loaded onto an Acquity UPLC® BEH 1.7 µm C18 column (2.1×50 mm), and chromatographic separation was performed on a Nexera X2 UPLC® system (Shimadzu) using a gradient of mobile phase A (0.1% formic acid) and mobile phase B (acetonitrile, 0.1% formic acid) at a flow rate of 300 µL/min. A 3.4-min gradient from 10-35% B was used. The QTRAP® 6500+ mass spectrometer (Sciex) was operated in positive ionization mode with an IonDrive™ Turbo V ion source. The key source parameters were set as follows: Curtain gas flow, 35; Collision gas, medium; Nebulizer gas, 50; Turbo IonSpray gas, 50; Ion spray voltage, 5500 V; Temperature, 500° C.

Data analysis: The raw data acquired on QTRAP® 6500+ were processed using Skyline software (29). All data were manually inspected to ensure accurate peak integration. Analyte to internal standard peak area ratio was used to quantify a target analyte. All the extracted ion chromatograms (XICs) and calibration curves included in this work were generated using Skyline.

ELISA: Soluble PD-L1 in serum samples was quantified by enzyme-linked immunosorbent assays (ELISA). In brief, Nunc MaxiSorp™ immuno plates were coated overnight at 2-8° C. with 1 µg/mL of monoclonal anti-human PD-L1 mouse antibody that binds to both uncomplexed PD-L1 and PD-L1 in a complex with atezolizumab. After washing, plates were treated for 1-3 hours with 200 µL/well of blocking reagent containing 0.5% BSA. One hundred microliters per well of calibrators and pre-diluted serum samples were then added to the blocked plates and incubated for 1 hour. The calibration curve consisted of recombinant human PD-L1 and ranged from 0.64 ng/mL to 0.005 ng/mL. Minimum required dilution for serum samples was 1:10. Plates were washed and then incubated with 10 µg/mL of atezolizumab for 1 hour to saturate bound PD-L1 with atezolizumab. Unbound materials were removed by washing. Biotinylated mouse monoclonal anti-atezolizumab antibody at 0.5 µg/mL was added as secondary detection antibody and incubated for 1 hour, followed by incubation with streptavidin horseradish peroxidase (HRP). After the final washing step, 100 µL/well of TMB (3,3',5,5'-tetramethylbenzidine) peroxidase substrate was added and incubated for 25-30 minutes. The reaction was stopped using 1M phosphoric acid and the plates were read on a SpectraMax plate reader at 450 nm read/630 nm reference wavelength. The PD-L1 concentrations in serum samples were quantitated from a fitted calibration curve.

Results

Workflow and Basic Principles of a Generic Reagent, Ultra-Targeted 2D-LC-MS/MS Method.

The main purpose of this work was to develop a fully automated mass spectrometry-based method for quantification of monoclonal antibodies and their target antigens with significantly improved sensitivity and without developing the high quality capture or detection antibody reagents that are typically required for ligand binding assays. With this aim in mind, we have developed a targeted 2D-LC based method. The overall workflow of this method is shown in FIG. 1. Generic protein A affinity capture is applied to extract the monoclonal antibody or antibody-antigen complex from sample matrix. After on-bead tryptic digestion, a fully automated targeted 2D-LC method is implemented to effectively separate the target analyte from matrix molecules with high resolution and reproducibility. Due to the significantly reduced matrix suppression, the assay sensitivity is dramatically improved.

A major advantage of this method over ligand binding assays is that it is independent of high quality reagents. Protein A affinity capture is used as a generic sample preparation procedure applicable to most antibodies or antibody complexes. Considering that protein A is widely available commercially and the cost is reasonable, our method does not require generating specific capture or detection antibody reagents and thus is very time- and cost-effective.

Figure 2:
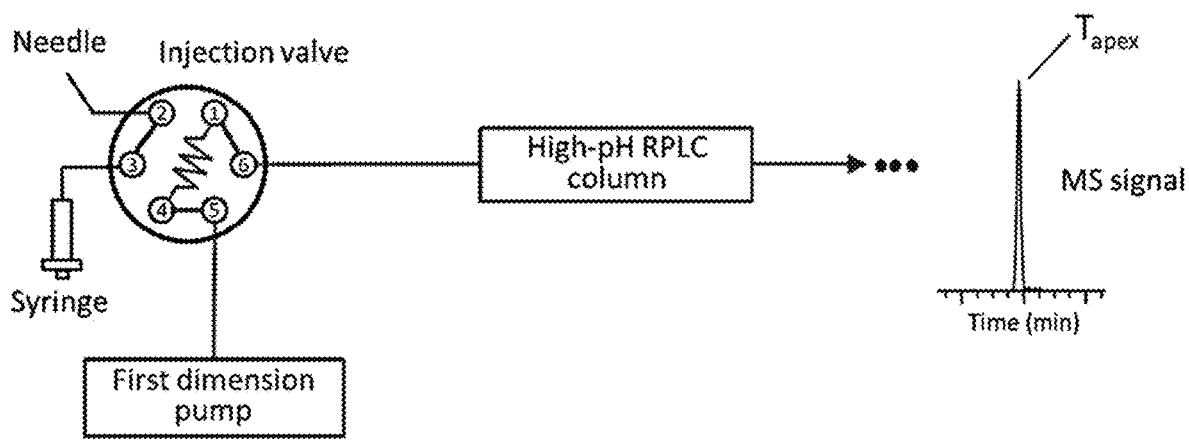
FIG. 2 shows the setup for determining the retention time window for analyte transfer by High-pH RPLC-MS/MD survey scan analysis. The retention time window is defined as $T_{apex}$+/−0.3 min, where $T_{apex}$ represents the retention time at the peak apex of the analyte.

Compared with the commonly used comprehensive 2D-LC approaches, the method described here is more targeted for the analyte. High-pH RPLC is used in the first-dimension separation, and the analyte fraction/portion within a narrow retention time window is selectively isolated and transferred to the second dimension for further separation by low-pH RPLC. To ensure that the analyte can be selectively transferred from the first dimension, a high-pH RPLC-MS/MS survey scan is performed to determine the accurate retention time and peak width of the analyte (FIG. 2). The retention time window for analyte transfer is defined as $T_{apex}+/-1$ PW, where $T_{apex}$ represents the retention time at the peak apex of the analyte and PW represents the peak width of the analyte. Under the LC conditions used in this work, the peak width of a peptide is typically 0.25-0.3 min. Therefore, the fraction/portion within the retention time window $T_{apex}+/-0.3$ min is transferred to the second dimension for all peptides analyzed in this work.

Following the high-pH RPLC-MS/MS survey scan analysis, a targeted-2D-with-dilution configuration (FIG. 3) is designed to selectively isolate the analyte in an automated manner. The method consists of five steps: (step 1) load sample and equilibrate columns; (step 2) inject sample and separate the analyte from matrix molecules using a linear high-pH RPLC gradient; (step 3) transfer target fraction/portion within a designated retention time window ($T_{apex}+/-0.3$ min) onto the trap column while diluting the fraction/portion with the second-dimension low-pH mobile phase A; (step 4) elute the analyte from the trap column and further separate it from residual matrix components by the analytical column using a linear low-pH RPLC gradient for MS analysis; (step 5) clean trap valve (both Position 1 and Position 2), tubings and columns using high organic mobile phases. The most critical step in this process is step 3, where analyte transfer is started by switching the trap valve position to "Position 2" at $T_{apex}-0.3$ min and ended by switching it back to "Position 1" at $T_{apex}+0.3$ min. Indeed, the main variable in the 2D-LC method is the trap valve switching time. During the analyte transfer process, the high pH fraction/portion is diluted through a mixing tee with the second-dimension mobile phase A (0.1% formic acid) to ensure the analyte can be trapped and concentrated onto the trap column (FIG. 3).

Unlike comprehensive 2D-LC which has a long timescale (typically several hours), the targeted 2D-LC method used in this work has a relatively short LC gradient. The total run time of the method is 20 min with full automation, enabling an assay throughput of 70 samples per day.

Targeted 2D-LC-MS/MS Enables Quantification of Monoclonal Antibodies in the pg/mL to Low ng/mL Range in Serum.

The performance of the targeted 2D-LC-MS/MS method has been systematically evaluated using an anti-CD22 monoclonal antibody spiked into monkey and human serum with a 2-fold serial dilution from 400 to 0.78 ng/mL. Two signature peptides of anti-CD22, IYPGDGDTNYSGK (SEQ ID NO: 1) and LSCAASGYEFSR (SEQ ID NO: 3), were selected for LC-MS/MS, with the former displaying a better response. Unless otherwise noted, the following method evaluation is based on the transition 693.8→555.7 of peptide IYPGDGDTNYSGK (SEQ ID NO: 1).

Figures 4A, 4B:
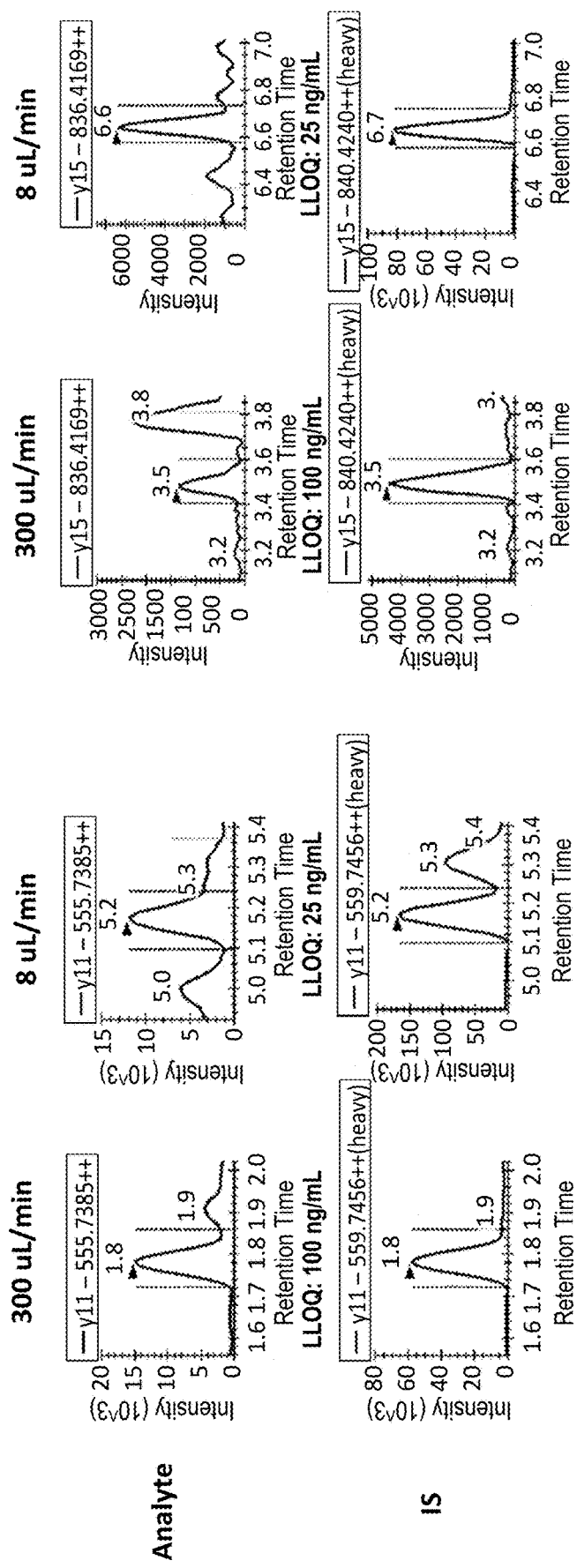
FIGS. 4A-B compares the sensitivity between analytical flow and microflow LC-MS/MS.

We first evaluated the effect of LC flow rate on assay sensitivity. When analyzing anti-CD22 spiked into monkey serum using conventional analytical flow LC-MS/MS (flow rate: 300 µL/min), the LLOQ was 100 ng/mL. In comparison, microflow LC-MS/MS (flow rate: 8 µL/min) analysis demonstrated a 4-fold improvement in assay sensitivity with an LLOQ of 25 ng/mL (FIG. 4a). A similar phenomenon was observed for Herceptin spiked into mouse serum (FIG. 4b). Based on the evaluation, the flow rate of the 2D-LC method was set at 8 µL/min.

Figure 5A:
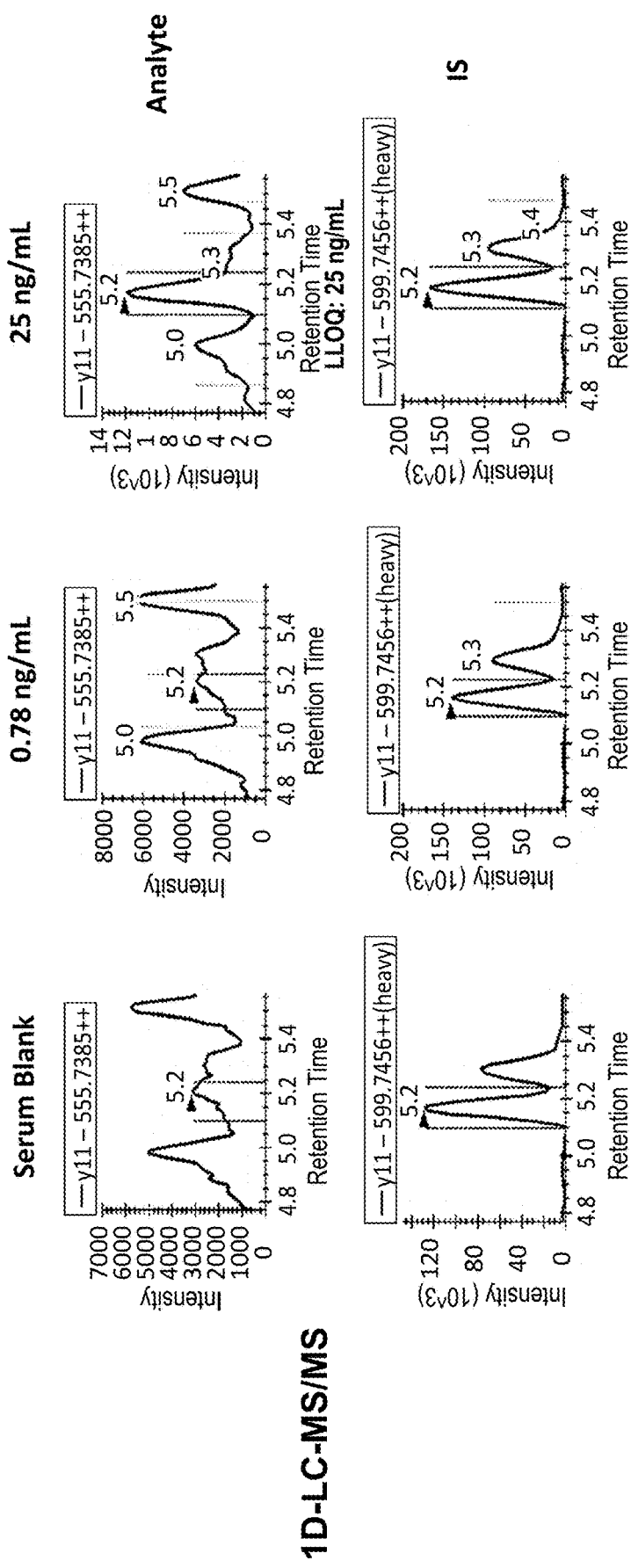
FIGS. 5A-B compares the sensitivity between microflow 1D-LC-MS/MS and 2D-LC-MS/MS by analyzing anti CD22 spiked into monkey serum. An anti-CD22 monoclonal antibody was spiked into monkey serum with a 2-fold serial dilution from 400 to 0.78 ng/mL. Fifty microliter of each serum sample was subject to protein A affinity capture and on-bead tryptic digestion. The same samples were analyzed by both 1D-LC-MS/MS (FIG. 5A) and 2D-LC-MS/MS (FIG. 5B) at the same LC flow rate 8 μL/min. The ion transition m/z 693.8→555.7 was monitored for peptide IYPGDGDTNYSGK (SEQ ID NO: 1). IS represents internal standard.
Figure 5B:
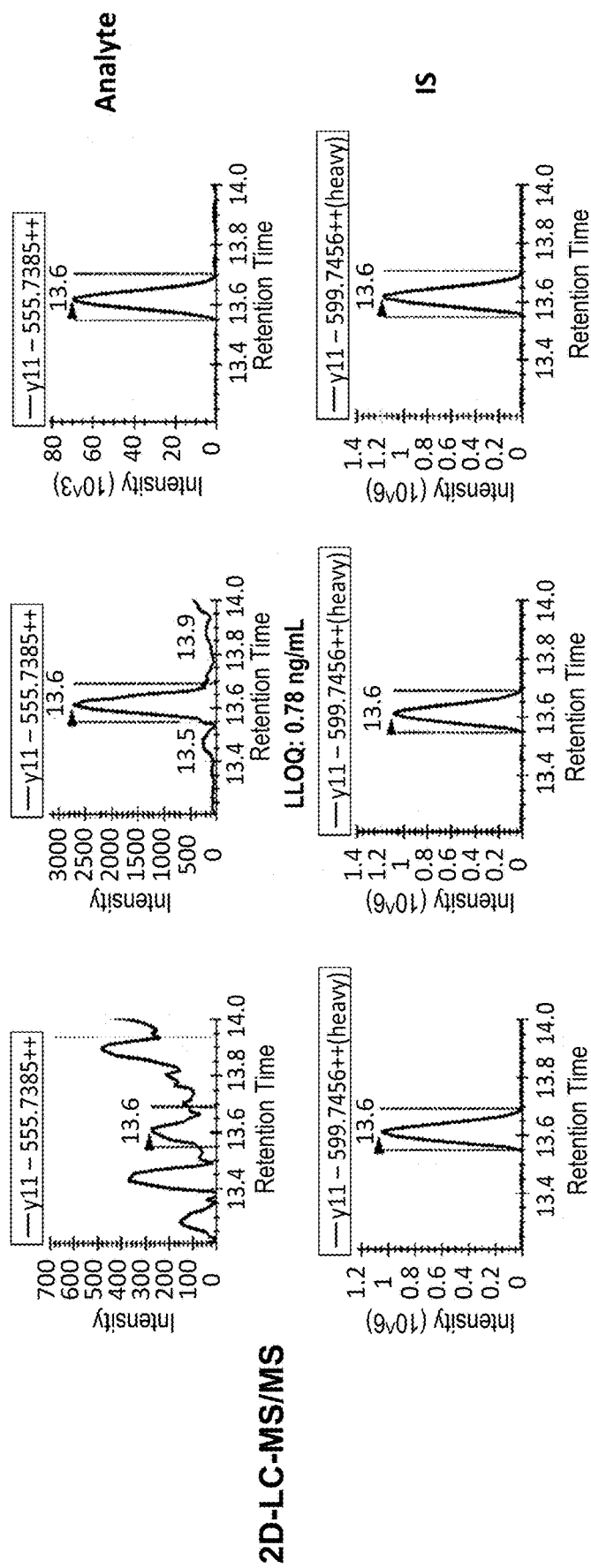

A head-to-head comparison of sensitivity was then conducted between 1D- and 2D-LC-MS/MS at the same flow rate, 8 µL/min. As shown in FIGS. 5A-B, the targeted 2D-LC-MS/MS method enabled ~6-fold increase in analyte intensity and ~10-fold decrease in background intensity. This results in an approximately 60-fold increase in S/N ratio. The LLOQ of anti-CD22 in the 1D- and 2D-LC-MS/MS assays were 25 ng/mL and 0.78 ng/mL, respectively (FIGS. 5A-B). Indeed, the S/N ratio at 0.78 ng/mL was still around 9 for the 2D-LC-MS/MS method, suggesting a higher sensitivity (e.g., 400 pg/mL) is potentially achievable.

Figure 6:
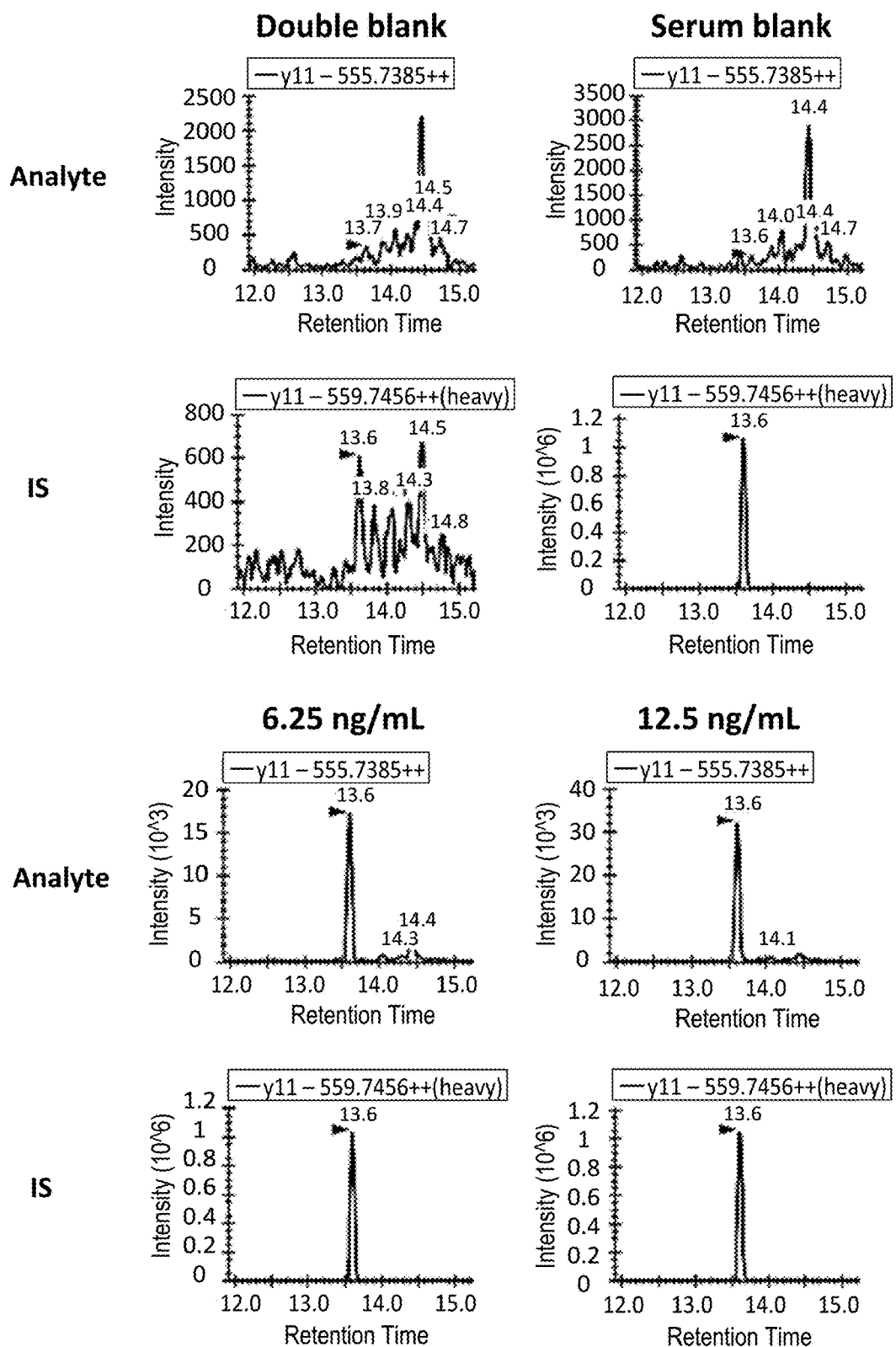
FIG. 6 shows the detection of peptide IYPGDGT-NYSGK (SEQ ID NO: 1) from monkey serum spiked with different concentrations of anti-CD22 from 0.78 ng/mL to 100 ng/mL. IS indicates internal standard; Double blank indicates monkey serum without analyte and IS; Serum blank indicates monkey serum spiked with IS but without analyte.
Figure 6:
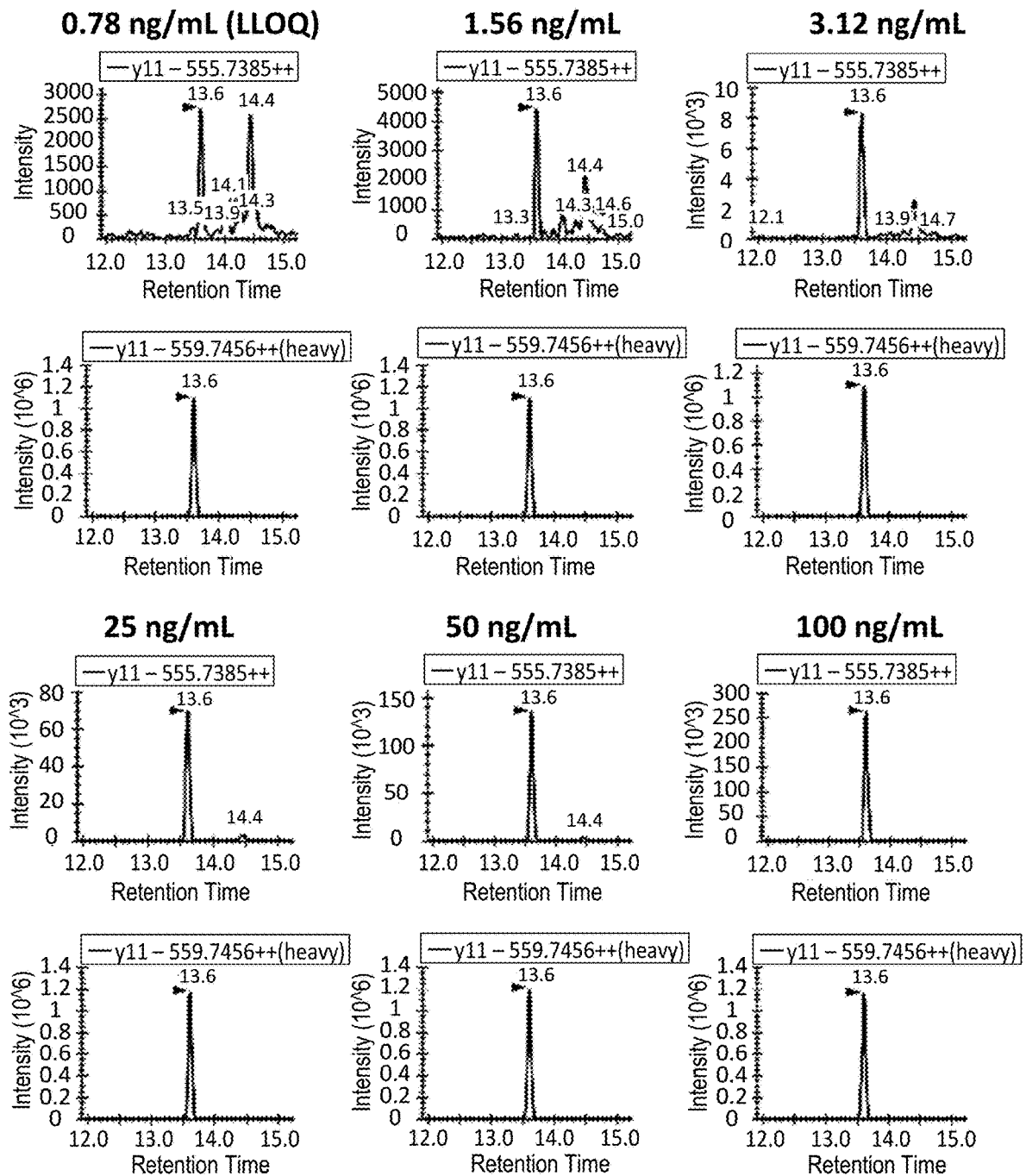
Figure 7:
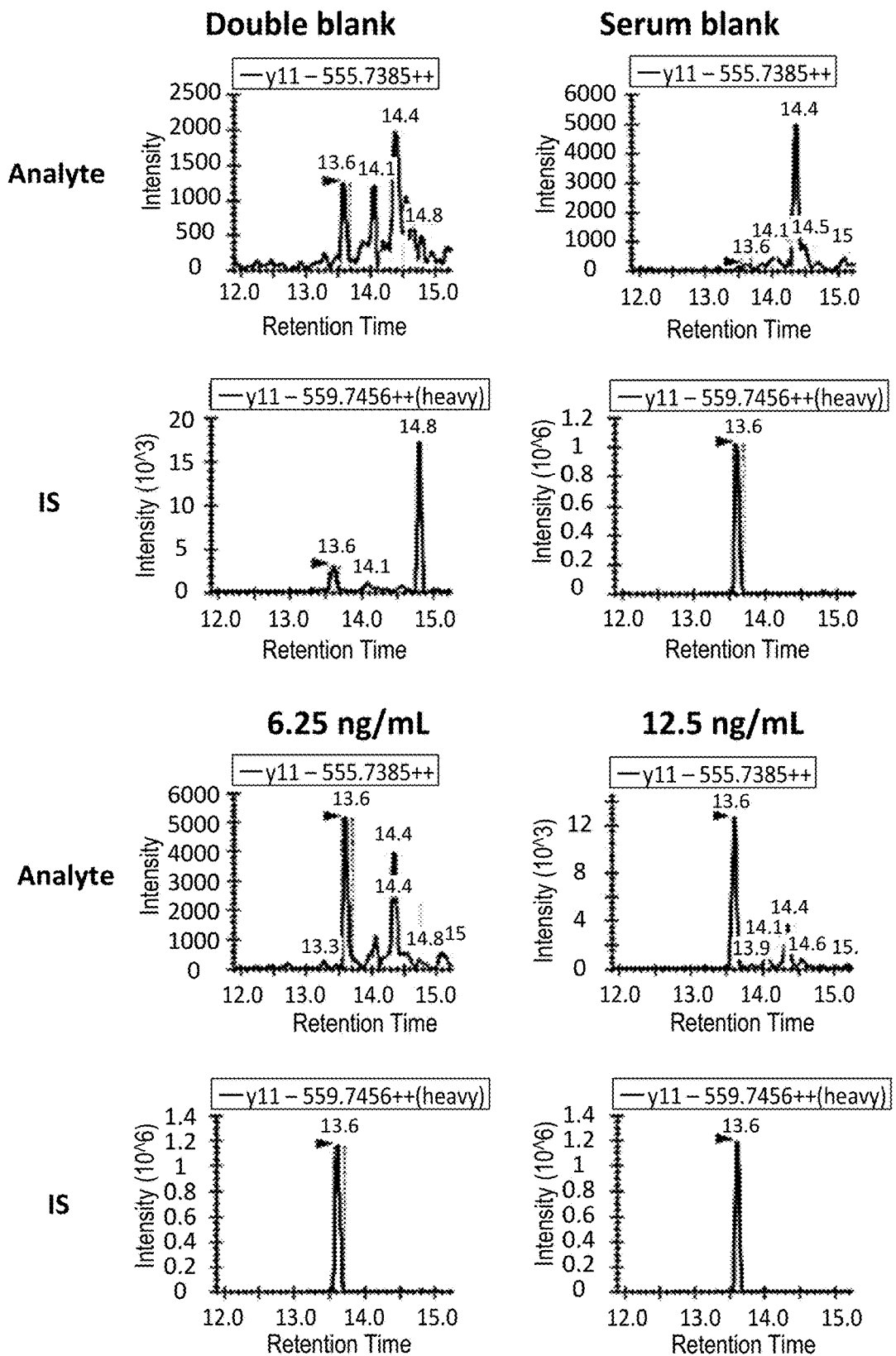
FIG. 7 shows the detection of peptide IYPGDGDT-NYSGK (SEQ ID NO: 1) from human serum spiked with different concentrations of anti-CD22 from 0.78 ng/mL to 100 ng/mL. IS indicates internal standard; Double blank indicates monkey serum without analyte or IS; Serum blank indicates monkey serum spiked with IS but without analyte. IS represents internal standard.
Figure 7:
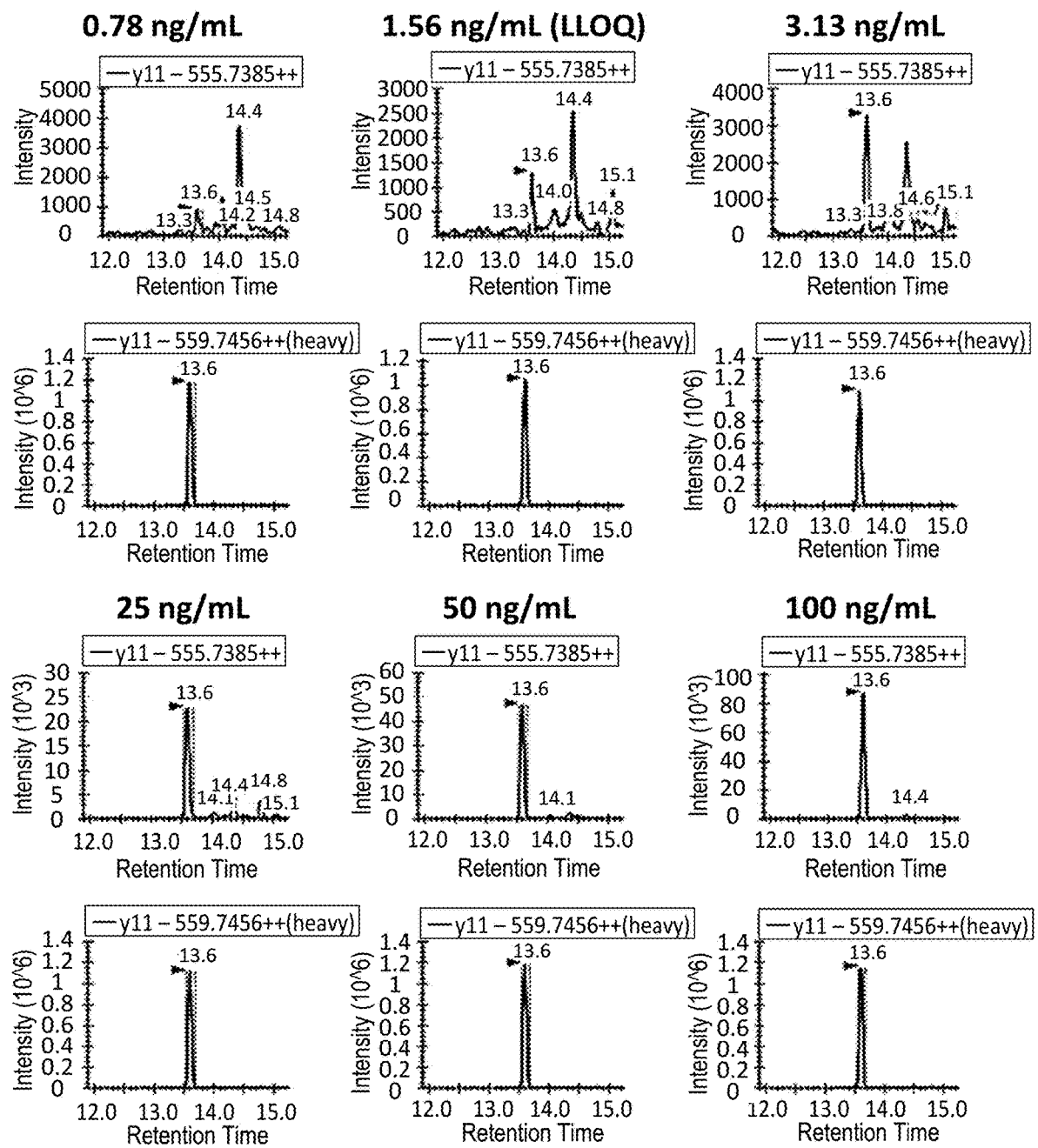
Figures 8A, 8B:
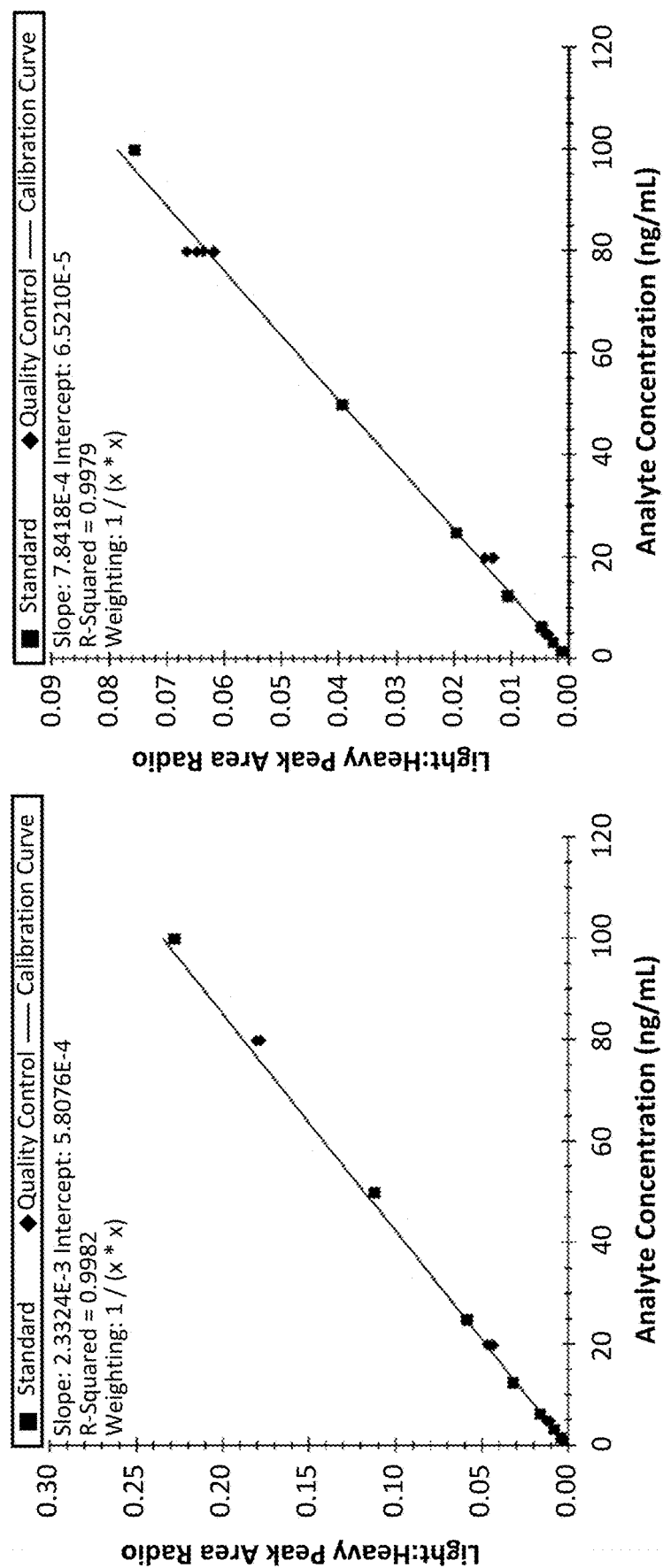
FIGS. 8A-B shows the calibration curves for peptide IYPGDGDTNYSGK (SEQ ID NO: 1).

The linearity of the targeted 2D-LC-MS/MS method was then evaluated using anti-CD22 spiked into both monkey and human serum. FIG. 6 depicts the extracted ion chromatograms (XICs) of transitions monitored for peptide IYPGDGDTNYSGK (SEQ ID NO: 1) in 50 µL of cyno serum samples with 2-fold serial dilutions, where the top and bottom panels indicate the responses of the analyte and internal standard (IS), respectively. While the internal standard intensity stayed stable across all spike-in samples (except for double blank where no IS was spiked), a 2-fold increment in the analyte intensity was observed which correlated well with the concentration of anti-CD22. A similar phenomenon was demonstrated in human serum samples (FIG. 7). A calibration curve was built by plotting analyte to internal standard peak area ratio (i.e., light:heavy peak area ratio) against analyte concentration, and excellent linearity was observed over a concentration range of 0.78-400 ng/mL and 1.56-400 ng/mL for monkey (FIG. 8a) and human (FIG. 8b) samples, respectively.

The precision and accuracy of the 2D-LC-MS/MS assay were further assessed by analyzing quality control (QC) samples with low, medium and high levels of anti-CD22. As shown in Table 2 below, the precision (% CV) was <10% and the accuracy (% difference from theoretical) was <15% for both monkey and human serum samples across all QC levels, which met the acceptance criteria recommended by the industry white paper (20) for LC-MS/MS method validation for protein therapeutics.

TABLE 2

Evaluation of precision and accuracy for the 2D-LC-MS/MS assay using quality control samples (QCs) with low, medium and high levels of anti-CD22.

|  |  | LQC | MQC | HQC |
|---|---|---|---|---|
|  | Theoretical concentration (ng/mL) | 5.00 | 20.00 | 80.00 |
|  | N | 4 | 4 | 4 |
| 50 µL | Measured concentration (ng/mL) | 4.51 | 19.03 | 76.79 |
| monkey | Precision (% CV) | 6.58 | 3.73 | 0.67 |
| serum | Accuracy (% DFT) | −9.72 | −4.85 | −4.02 |

TABLE 2-continued

Evaluation of precision and accuracy for the 2D-LC-MS/MS assay using quality control samples (QCs) with low, medium and high levels of anti-CD22.

|  |  | LQC | MQC | HQC |
|---|---|---|---|---|
| 50 µL | Measured concentration (ng/mL) | 4.79 | 17.15 | 81.64 |
| human | Precision (% CV) | 5.73 | 5.32 | 3.11 |
| serum | Accuracy (% DFT) | −4.21 | −14.24 | 2.05 |

In Table 2, LQC, MQC, HQC represents low, medium and high QC, respectively; CV, coefficient of variation; DFT, difference from theoretical value.

Figure 9:
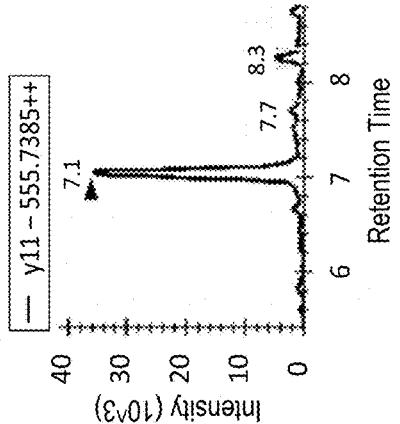
FIG. 9 shows the evaluation of analyte retention time reproducibility during high-pH RPLC separation using peptide IYPGDGDTNYSGK (SEQ ID NO: 1). Fifty microliters of monkey serum spiked with 400 ng/mL of anti-CD22 was subject to protein A affinity capture and on-bead tryptic digestion. This sample was analyzed three times (i.e., injections 1 (Day 1), 180 (Day 3) and 320 (Day 5)) on three different days in a run containing 320 samples by high-pH RPLC-MS/MS. IS represents internal standard.
Figure 9:
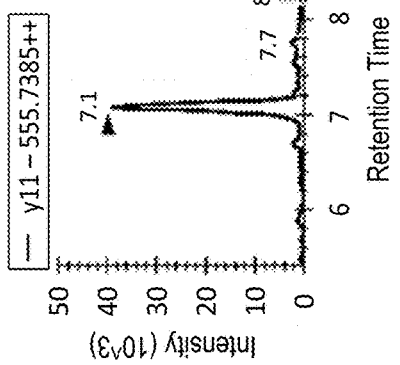
Figure 9:
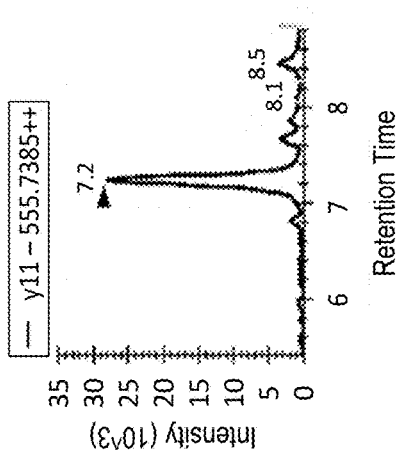
Figure 9:
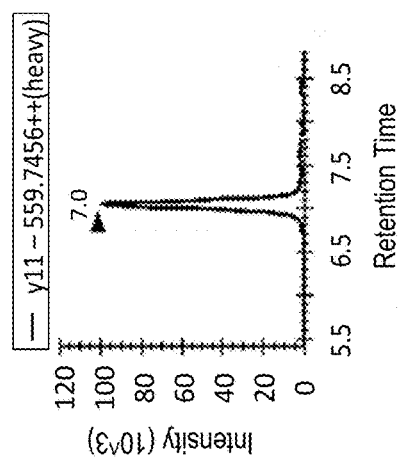
Figure 9:
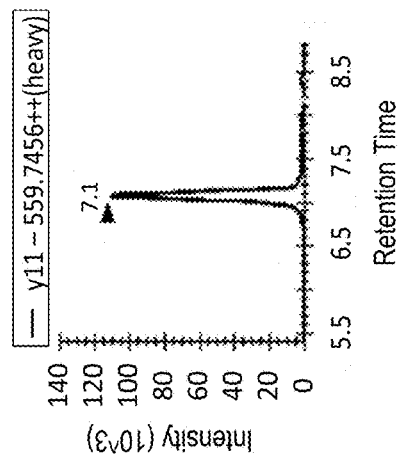
Figure 9:
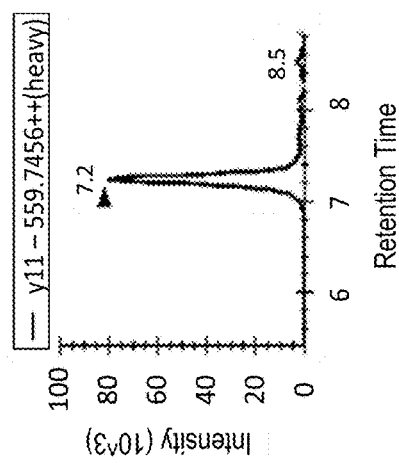

The reproducibility of the analyte retention time during high-pH RPLC separation is critical to the automation of the targeted 2D-LC-MS/MS method. We evaluated it by injecting the same sample three times (i.e., injections 1, 180 and 320) on three different days in a run containing 320 samples. As shown in FIG. 9, the retention time was relatively stable, with a small shift of only 0.1 min after 180 injections and 0.15 min after 320 injections. Considering that the analyte is transferred from the first dimension in a 0.6-min retention time window ($T_{apex}$+/−0.3 min), this small shift in retention time will not result in a significant loss of analyte or internal standard during the transfer process. Even if there is some loss, the assay precision and accuracy will not be affected because the quantification is based on the ratio of analyte to internal standard which remains unchanged regardless of the transfer recovery of the analyte. Nevertheless, it is recommended to verify and adjust the retention time window after every 300 injections to transfer the analyte to the second dimension to maintain assay sensitivity. For a small run (i.e., less than 300 samples), there is no need to adjust the retention time window.

The carryover of the 2D-LC-MS/MS method was also evaluated by comparing the peak areas between a sample with a high concentration of analyte and a matrix blank following it. As demonstrated in Table 3 below, the carryover was ~0.3% for both the analyte and IS. A similarly low carryover was observed for all the other molecules we have analyzed using this method (data not shown).

TABLE 3

Evaluation of carryover for the 2D-LC-MS/MS method using peptide IYPGDGDTNYSGK (SEQ ID NO: 1).

|  | Analyte | IS |
|---|---|---|
| 400 ng/mL | 4533507 | 4820611 |
| Carryover Blank | 11717 | 14473 |
| Carryover | 0.26% | 0.30% |

For Table 3, fifty microliters of monkey serum spiked with 400 ng/ml of anti-CD22 was analyzed using protein A affinity capture 2D-LC-MS/MS. The carryover was calculated based on the peak areas of this sample and the carryover blank following it. IS represents internal standard.

Maintaining stable spray at a microflow rate may improve the robustness of this method. For example, one can use an Optiflow® ion source that is optimized for microflow LC-MS/MS. According to our recent evaluation, no spray issue was observed during a period where over 1200 serum samples were analyzed using an Optiflow® ion source.

Figure 10:
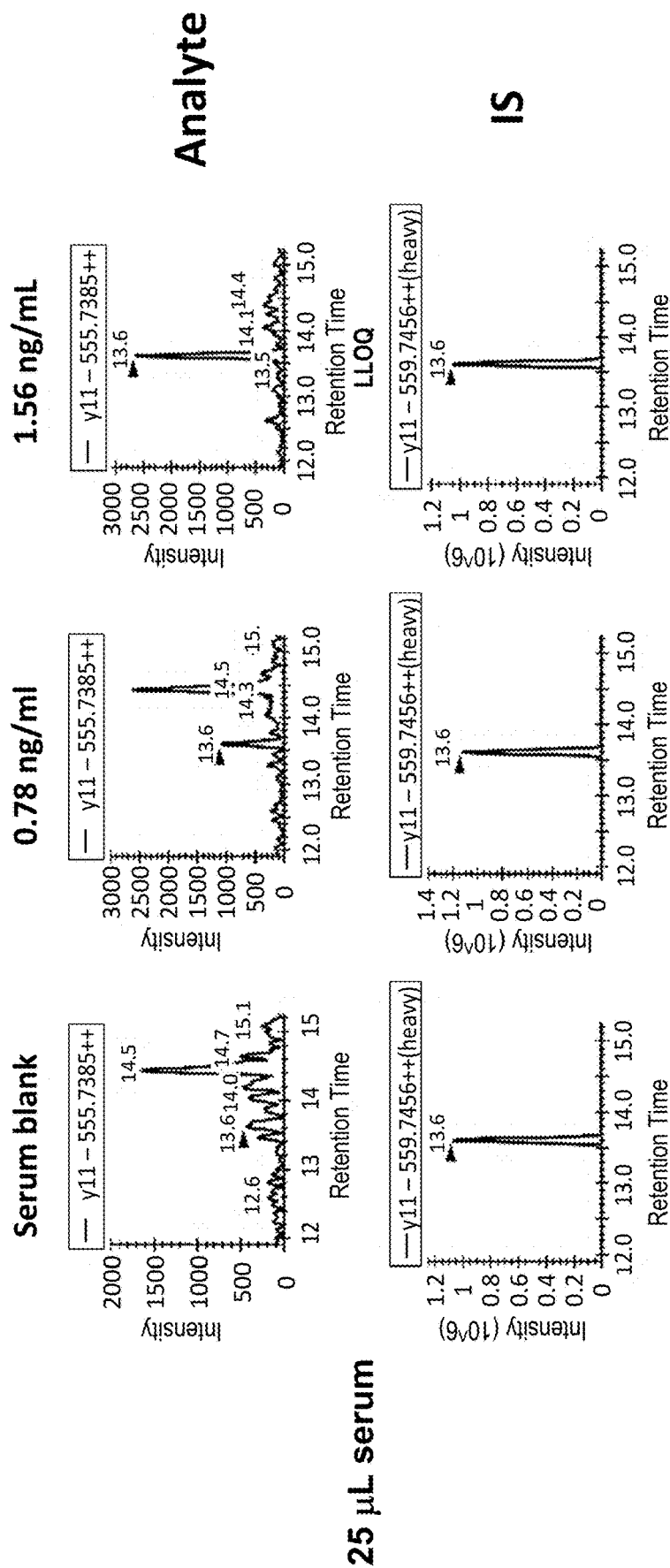
FIG. 10 shows the evaluation of the effect of sample volume on 2D-LC-MS/MS assay sensitivity. An anti-CD22 monoclonal antibody was spiked into monkey serum at 400 ng/mL followed by 2-fold serial dilutions, resulting in concentrations from 400 to 0.78 ng/mL, and each serum sample was analyzed twice with different starting volumes (i.e., 25 μL vs. 50 IS represents internal standard.
Figure 10:
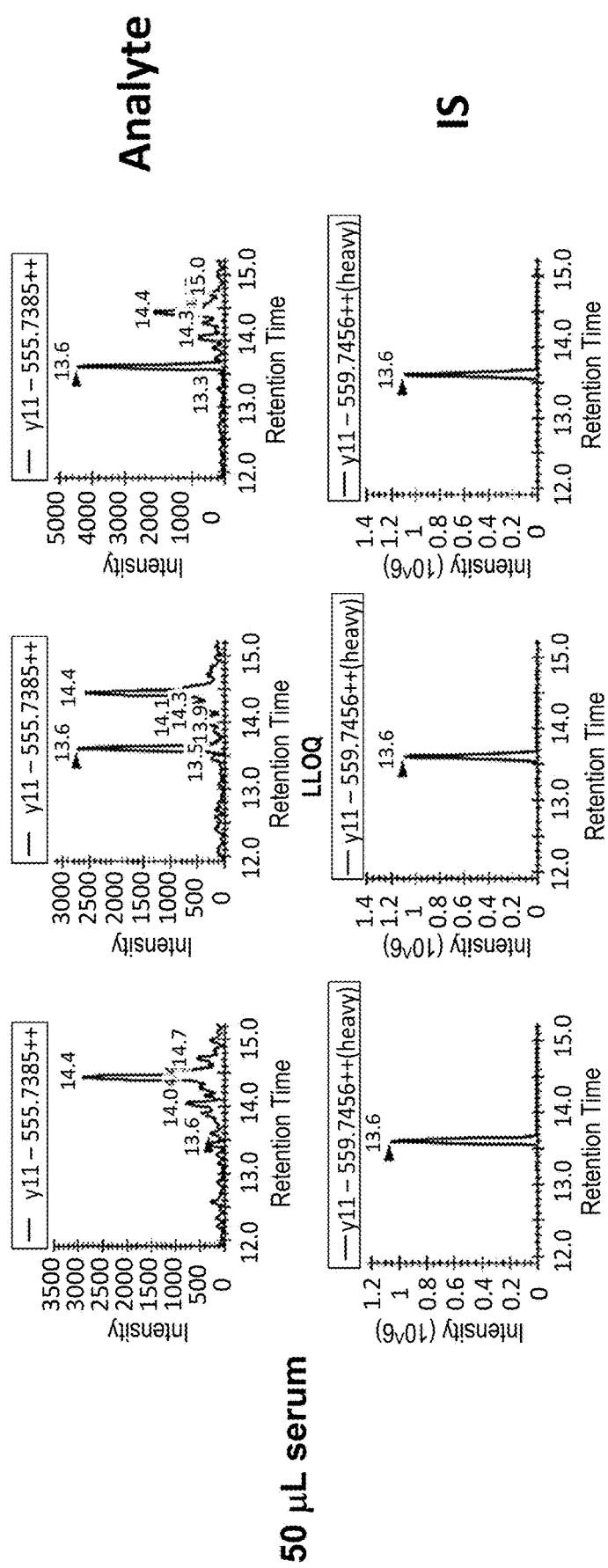

We have also evaluated the effect of sample volume on assay sensitivity. As shown in FIG. 10, when increasing serum volume from 25 µL to 50 µL, the background intensity was not significantly increased at the analyte retention time due to the excellent separation efficiency by 2D-LC, while there was a 2-fold increase in analyte intensity. This observation indicates that the sensitivity of the 2D-LC-MS/MS assay can be enhanced by increasing sample volume.

Figure 11B:
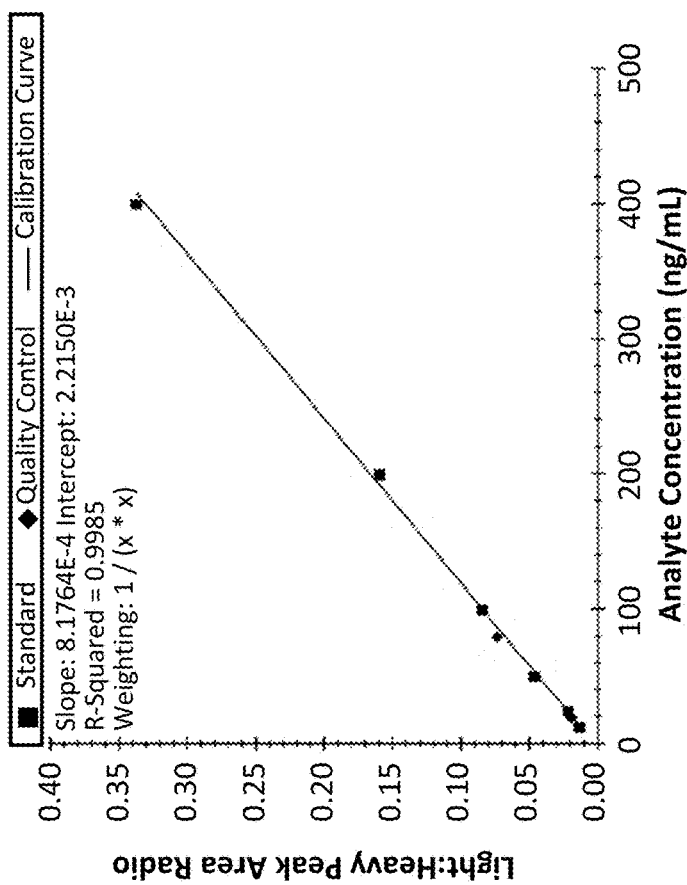
FIGS. 11A-B shows the calibration curves for peptide LSCAASGYEFSR (SEQ ID NO: 3).
Figure 11A:
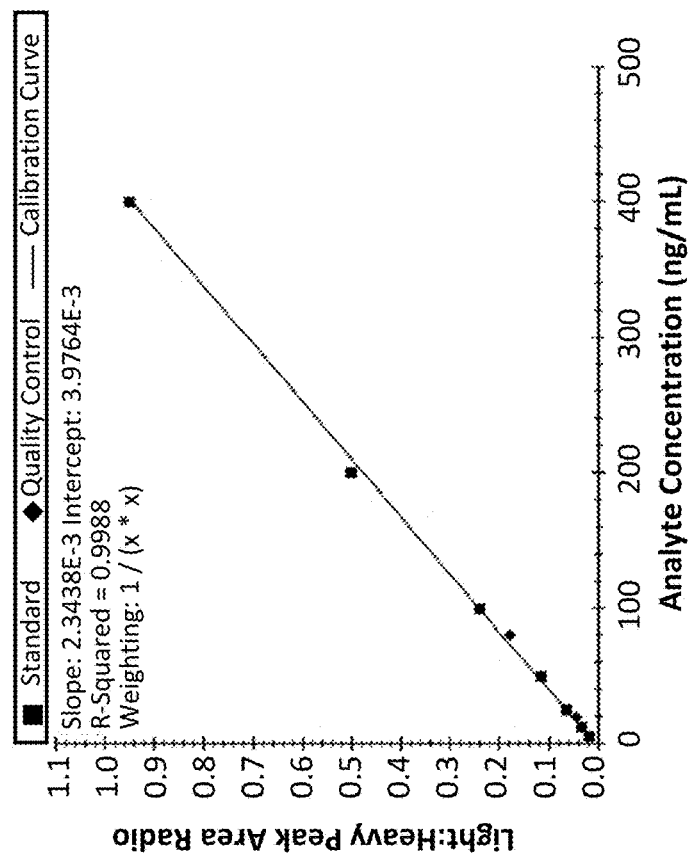

A second peptide, LSCAASGYEFSR (SEQ ID NO: 3), was also monitored for anti-CD22. Using the same generic protein A affinity capture and targeted 2D-LC-MS/MS approach, an LLOQ of 6.25 and 12.5 ng/mL was achieved for monkey and human serum samples, respectively (FIGS. 11A-B). This represents an over 30-fold improvement in assay sensitivity compared with microflow 1D-LC-MS/MS (data not shown).

Figure 12:
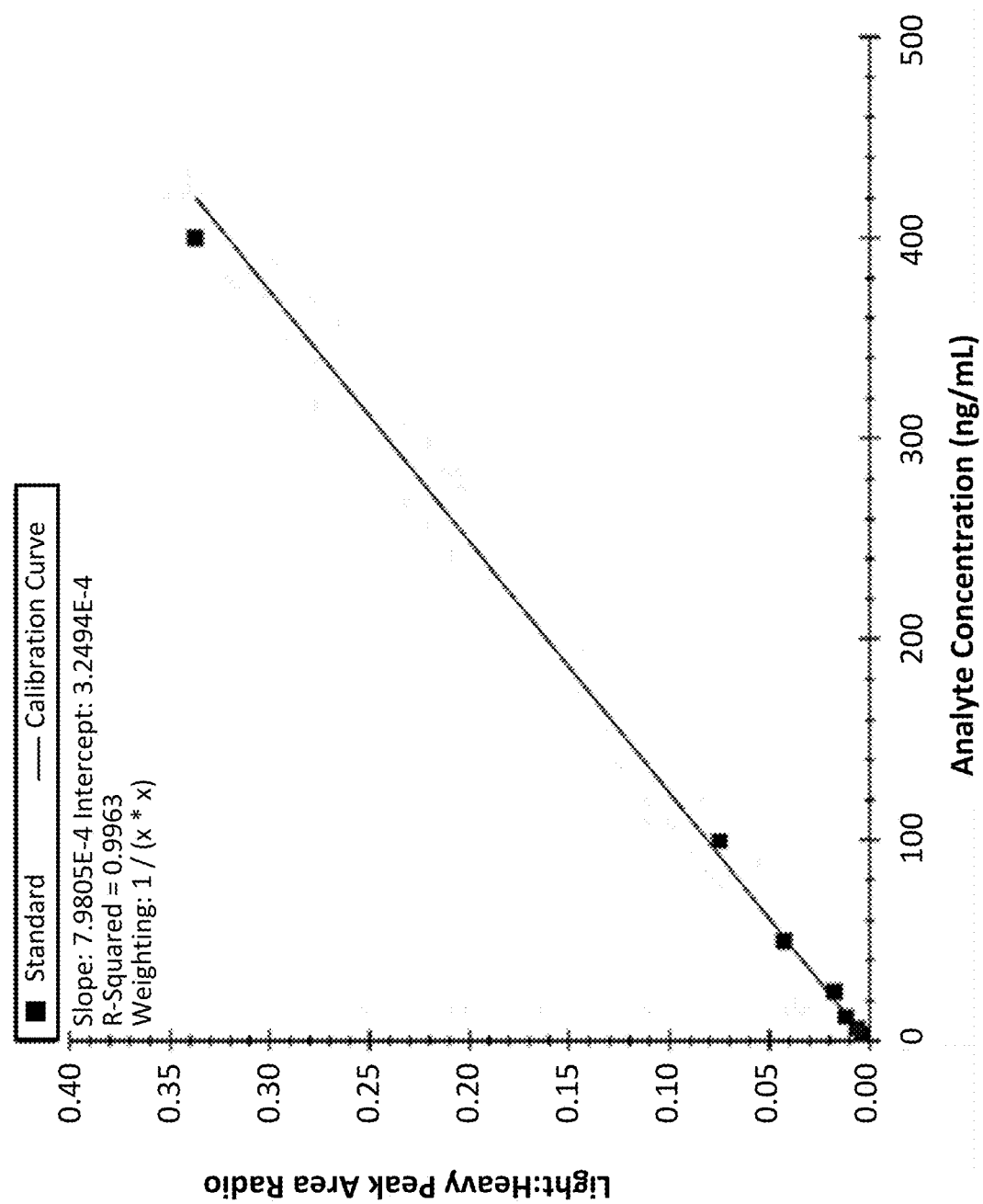
FIG. 12 shows the calibration curve for peptide FTFSLDTSK (SEQ ID NO: 8) from 50 μL of monkey serum spiked with anti-CD22. The analyte to internal standard peak area ratio (i.e., light to heavy peak area ratio) was plotted against analyte concentration.

The above evaluation using anti-CD22 monoclonal antibody indicates our method allows reagent-independent, highly sensitive and robust quantification of biotherapeutics with full automation. We further confirmed the performance of this method using another monoclonal antibody bevacizumab, and excellent linearity was observed over a concentration range of 3.13-400 ng/mL in monkey serum with an LLOQ of 3.13 ng/mL (FIG. 12).

Targeted 2D-LC-MS/MS Enables Highly Sensitive Quantification of Soluble Targets for Antibody Therapeutics.

We have also applied the protein A affinity capture 2D-LC-MS/MS method to quantify the soluble targets for monoclonal antibody therapeutics in human serum which are frequently evaluated as predictive or therapeutic biomarkers (22-26). In the blood, a therapeutic monoclonal antibody can specifically bind to its target antigen and form an antigen-antibody complex which can be captured from the samples by the Protein A beads.

Figure 13A:
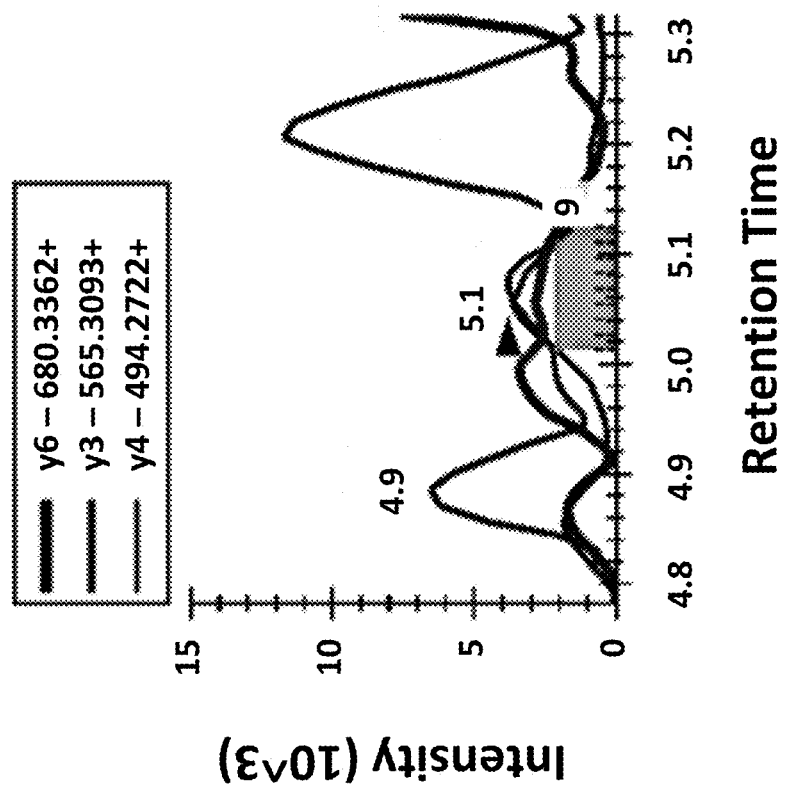
FIGS. 13A-B shows the evaluation of PD-L1 binding by atezolizumab. 0.145 μM of PD-L1 was incubated with 2.9 μM of atezolizumab (molar ratio 1:20) at room temperature for 2 hours, and then the sample was subject to protein A affinity capture (AC1). Following AC1, atezolizumab was added to the supernatant at the same concentration (2.9 μM) and incubated at room temperature for another 2 hours, and was then subject to the second round protein A affinity capture (AC2). The molecules captured by both AC1 and AC2 were digested and analyzed by 2D-LC-MS/MS.
Figure 13B:
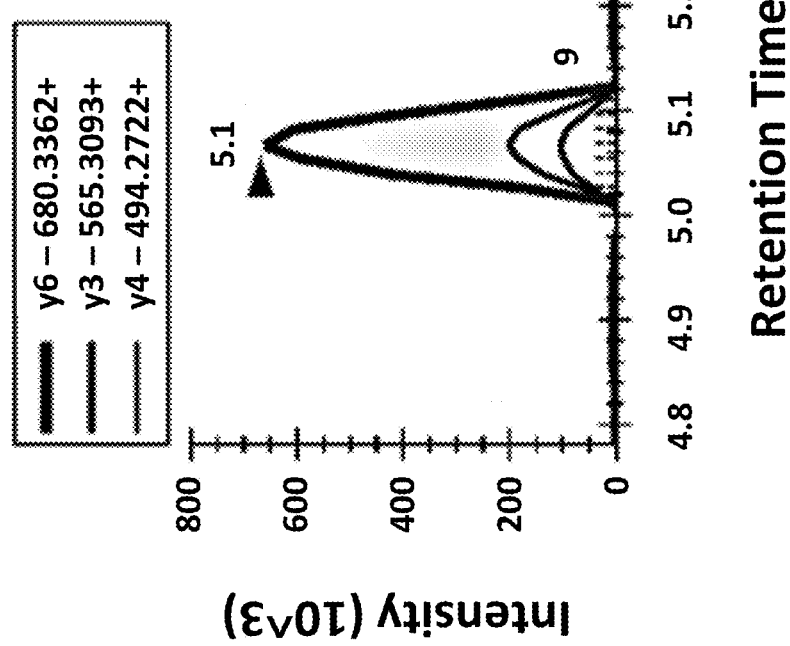
Figures 14A, 14B:
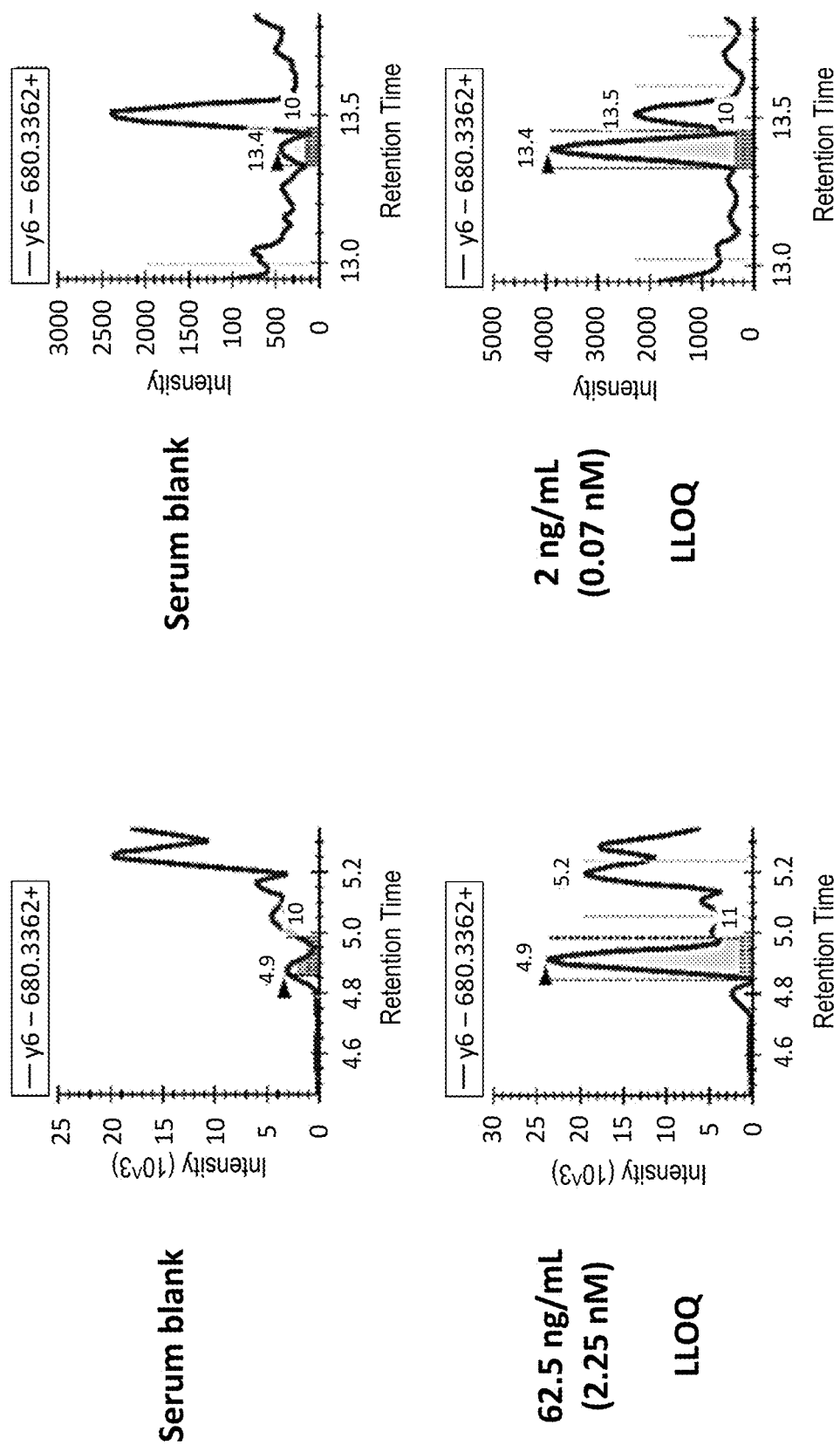
FIGS. 14A-B compares the sensitivity between microflow 1D-LC-MS/MS and 2D-LC-MS/MS for quantification of soluble PD-L1. The atezolizumab-PD-L1 complex was spiked into normal human serum with a 2-fold serial dilution where the concentration of PD-L1 ranged from 500 to 2 ng/mL (or 18 to 0.07 nM).
Figures 15A, 15B:
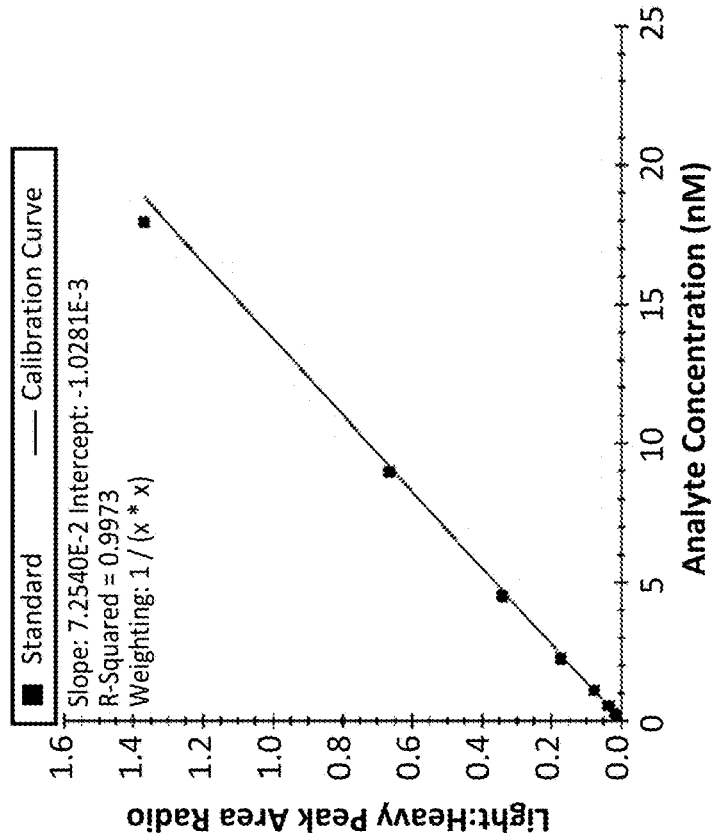
FIGS. 15A-D shows the application of the targeted 2D-LC-MS/MS method to measure total concentration of soluble PD-L1 variants that bind to atezolizumab in post-treatment serum samples.
Figures 15C, 15D:
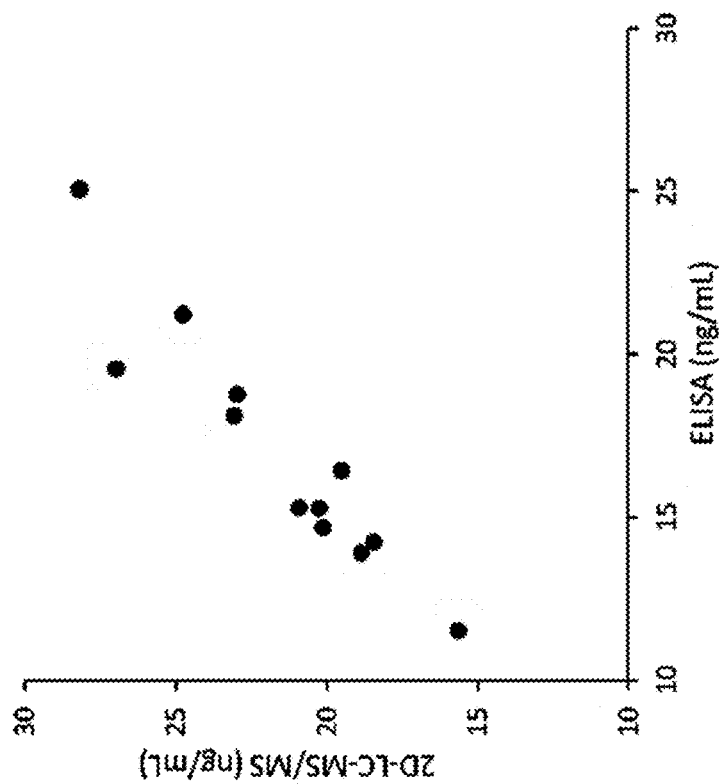

In the present work, we have measured the circulating concentration of PD-L1, an important immune checkpoint molecule, after treatment with atezolizumab, a humanized anti-PD-L1 monoclonal antibody. In the post-treatment patient serum samples, atezolizumab is in large molar excess due to the high dose level, and soluble PD-L1 is in a complex with atezolizumab. To mimic the in vivo situation, a similar complex was prepared in vitro by incubating PD-L1 with atezolizumab at a molar ratio of 1:20 which ensured that all PD-L1 is bound by atezolizumab (FIGS. 13A-B). This atezolizumab-PD-L1 complex was then spiked into normal human serum with a 2-fold serial dilution where the concentration of PD-L1 ranged from 500 to 2 ng/mL (or 18 to 0.07 nM). The spike-in samples were initially tested using microflow 1D-LC-MS/MS, but the LLOQ was only ~60 ng/mL which was not sufficient for measuring soluble PD-L1 in post-treatment samples (FIG. 14a). In contrast, the targeted 2D-LC-MS/MS method enabled over 30-fold improvement in sensitivity (FIG. 14b) and allowed accurate quantification of soluble PD-L1 in these samples. It is reported that there are multiple splice variants of PD-L1 in circulation (24, 27, 28) and atezolizumab binds to the PD-L1 IgV domain (29). To measure the total concentration of soluble PD-L1 variants bound by atezolizumab, a signature peptide from the PD-L1 IgV domain, LQDAGVYR (SEQ ID NO: 6), was selected for LC-MS/MS. Considering that the PD-L1 variants vary in molecular weight, a calibration curve was built using molar concentration rather than mass concentration, and excellent linearity was observed over a concentration range of 0.07-18 nM (FIG. 15a). A total of 12 post-treatment serum samples were analyzed where the concentration of total soluble PD-L1 was measured as around 0.6-1.0 nM (FIG. 15b). Assuming the predominant form of PD-L1 is wild type, the mass concentration of soluble PD-L1 in these samples would be around 15-25 ng/mL (FIG. 15c), which correlated well with the concentration determined by ELISA (FIG. 15d). The results indicate that the concentrations of circulating PD-L1 variants are not high enough to block the effect of atezolizumab. Indeed, the absolute concentration measured in 2D-LC-MS/MS was about 20-30% higher than in ELISA. Note that the protein A affinity capture 2D-LC-MS/MS method enables measurement of the total concentration of PD-L1 variants that bind to atezolizumab, while ELISA could underestimate total soluble PD-L1 concentration because some of the variants might not be captured by the second antibody.

Conclusion

In this work, we have developed an affinity capture and targeted 2D-LC-MS/MS based method which was over 100-fold more sensitive than conventional LC-MS/MS. Due to the significantly enhanced sensitivity, monoclonal antibody therapeutics can be accurately quantified by this method in the pg/mL to low ng/mL range in both nonclinical and clinical serum samples even without high quality capture or detection antibody reagents. This method was also successfully implemented to measure the total concentration of a soluble antigen, PD-L1, in post-treatment patient serum samples, which was not quantifiable with microflow 1D-LC-MS/MS. The method is highly robust, fully automated, and easy to implement. It has tremendous potential for supporting assessment of pharmacokinetics and biomarkers during the drug development process. It is particularly beneficial when high assay sensitivity is required when the critical reagents for ligand binding assays are not available.

Example 2

This Example describes an exemplary method for capturing analytes from tissue samples. Tissue samples were suspended in ice-cold tissue lysis buffer (25 mM Tris-HCl pH 7.4, 150 mM NaCl, 1% NP-40, 1 mM EDTA, 5% glycerol) supplemented with cOmplete™ EDTA-free protease inhibitor cocktail Tablet (SigmaAldrich), and then homogenized with OMNI international Bead Ruptor™ and Cooling Unit using 1.4 mm ceramic beads. Tissue lysates were transferred to 1.5 mL Protein LoBind™ tubes (Eppendorf®) and centrifuged at 15000 g for 6 minutes at 4° C. The protein concentration of supernatant was determined by Pierce™ BCA Protein Assay Kit. A drug target protein was captured from each sample by incubating tissue lysates with an antibody against the drug target immobilized onto Protein A magnetic beads. Following on-bead tryptic digestion, signature peptides of the drug target protein, which may be in nonalkylated or alkylated form, were analyzed by targeted 2D-LC-MS/MS. When target protein is alkylated by a small molecule drug, both free and alkylated target can be quantified using the method described above. This enables assessment of alkylated target engagement.

REFERENCE LIST

1. O'Hara D M, et al. (2012) Ligand binding assays in the 21st century laboratory: recommendations for characterization and supply of critical reagents. *AAPS J* 14(2):316-328.
2. King L E, et al. (2014) Ligand binding assay critical reagents and their stability: recommendations and best practices from the Global Bioanalysis Consortium Harmonization Team. *AAPS J* 16(3):504-515.
3. DeSilva B, et al. (2003) Recommendations for the bioanalytical method validation of ligand-binding assays to support pharmacokinetic assessments of macromolecules. *Pharm Res* 20(11): 1885-1900.
4. Leenaars M & Hendriksen C F (2005) Critical steps in the production of polyclonal and monoclonal antibodies: evaluation and recommendations. *ILAR J* 46(3):269-279.

5. O'Hara D M & Theobald V (2013) Life cycle management of critical ligand-binding reagents. *Bioanalysis* 5(21):2679-2696.
6. Addona T A, et al. (2009) Multi-site assessment of the precision and reproducibility of multiple reaction monitoring-based measurements of proteins in plasma. *Nat Biotechnol* 27(7):633-641.
7. Picotti P, Bodenmiller B, Mueller L N, Domon B, & Aebersold R (2009) Full dynamic range proteome analysis of S. cerevisiae by targeted proteomics. *Cell* 138(4): 795-806.
8. Gerber S A, Rush J, Stemman O, Kirschner M W, & Gygi S P (2003) Absolute quantification of proteins and phosphoproteins from cell lysates by tandem M S. *Proc Natl Acad Sci USA* 100(12):6940-6945.
9. Picotti P & Aebersold R (2012) Selected reaction monitoring-based proteomics: workflows, potential, pitfalls and future directions. *Nat Methods* 9(6):555-566.
10. Kuzyk M A, et al. (2009) Multiple reaction monitoring-based, multiplexed, absolute quantitation of 45 proteins in human plasma. *Mol Cell Proteomics* 8(8):1860-1877.
11. Kaur S, et al. (2016) Validation of a biotherapeutic immunoaffinity-LC-MS/MS assay in monkey serum: 'plug-and-play' across seven molecules. *Bioanalysis* 8(15):1565-1577.
12. Li H, et al. (2012) General LC-MS/MS method approach to quantify therapeutic monoclonal antibodies using a common whole antibody internal standard with application to preclinical studies. *Anal Chem* 84(3):1267-1273.
13. Heudi O, et al. (2008) Towards absolute quantification of therapeutic monoclonal antibody in serum by LC-MS/MS using isotope-labeled antibody standard and protein cleavage isotope dilution mass spectrometry. *Anal Chem* 80(11):4200-4207.
14. Keshishian H, et al. (2009) Quantification of cardiovascular biomarkers in patient plasma by targeted mass spectrometry and stable isotope dilution. *Mol Cell Proteomics* 8(10):2339-2349.
15. Shi T, et al. (2012) Antibody-free, targeted mass-spectrometric approach for quantification of proteins at low picogram per milliliter levels in human plasma/serum. *Proc Natl Acad Sci USA* 109(38): 15395-15400.
16. Gilar M, Olivova P, Daly A E, & Gebler J C (2005) Two-dimensional separation of peptides using RP-RP-HPLC system with different pH in first and second separation dimensions. *J Sep Sci* 28(14):1694-1703.
17. Shen Y, et al. (2015) Online 2D-LC-MS/MS assay to quantify therapeutic protein in human serum in the presence of pre-existing antidrug antibodies. *Anal Chem* 87(16):8555-8563.
18. Zhang G, et al. (2019) A sensitive antibody-free 2D-LC-MS/MS assay for the quantitation of myostatin in the serum of different species. *Bioanalysis* 11(10):957-970.
19. Zhang M, et al. (2018) Sensitive, High-Throughput, and Robust Trapping-Micro-LC-MS Strategy for the Quantification of Biomarkers and Antibody Biotherapeutics. *Anal Chem* 90(3):1870-1880.
20. Jenkins R, et al. (2015) Recommendations for validation of LC-MS/MS bioanalytical methods for protein biotherapeutics. *AAPS J* 17(1):1-16.
21. Ali S M, et al. (2008) Serum HER-2/neu and relative resistance to trastuzumab-based therapy in patients with metastatic breast cancer. *Cancer* 113 (6): 1294-1301.
22. Zheng S, McIntosh T, & Wang W (2015) Utility of free and total target measurements as target engagement and efficacy biomarkers in biotherapeutic development—opportunities and challenges. *J Clin Pharmacol* 55 Suppl 3:S75-84.
23. Zhou J, et al. (2017) Soluble PD-L1 as a Biomarker in Malignant Melanoma Treated with Checkpoint Blockade. *Cancer Immunol Res* 5(6):480-492.
24. Moreno-Aspitia A, et al. (2013) Soluble human epidermal growth factor receptor 2 (HER2) levels in patients with HER2-positive breast cancer receiving chemotherapy with or without trastuzumab: results from North Central Cancer Treatment Group adjuvant trial N9831. *Cancer* 119(15):2675-2682.
25. Samineni D, Girish S, & Li C (2016) Impact of Shed/Soluble targets on the PK/PD of approved therapeutic monoclonal antibodies. *Expert Rev Clin Pharmacol* 9(12):1557-1569.
26. He X H, Xu L H, & Liu Y (2005) Identification of a novel splice variant of human PD-L1 mRNA encoding an isoform-lacking Igv-like domain. *Acta Pharmacol Sin* 26(4):462-468.
27. Nielsen C, Ohm-Laursen L, Barington T, Husby S, & Lillevang S T (2005) Alternative splice variants of the human PD-1 gene. *Cell Immunol* 235(2):109-116.
28. Zhang F, et al. (2017) Structural basis of the therapeutic anti-PD-L1 antibody atezolizumab. *Oncotarget* 8(52): 90215-90224.
29. MacLean B, et al. (2010) Skyline: an open source document editor for creating and analyzing targeted proteomics experiments. *Bioinformatics* 26(7):966-968.

What is claimed is:

1. A method of detecting an analyte in a sample, comprising:
   (a) performing high pH reversed phase liquid chromatography (RPLC) survey scan with detection by mass spectrometry (MS) on the analyte at previously determined concentration in the presence of an internal standard, to determine the peak apex ($T_{apex}$) of the analyte;
   (b) obtaining an experimental sample comprising the analyte;
   (c) performing high pH RPLC on the sample of (b);
   (d) collecting at least a portion of the high pH RPLC eluate of (c) corresponding to $T_{apex}$ for the analyte+/− average peak width of the analyte or of the internal standard in the survey scan of (a), wherein the at least a portion is optionally collected in a trap column;
   (e) performing low pH RPLC on the collected portion of the high pH RPLC eluate of (d); and
   (f) detecting the analyte by MS.

2. The method of claim 1, wherein the analyte is a peptide, an antibody binding fragment, an antigen, or a drug binding target.

3. The method of claim 1, wherein the high pH RPLC and the low pH RPLC are each performed at microflow rates.

4. The method of claim 1, wherein the high pH RPLC is performed on a C18 column, the low pH RPLC is performed on a C18 column, or both the high pH RPLC and the low pH RPLC are performed on a C18 column.

5. The method of claim 1, wherein the high pH RPLC and survey scan are performed at a pH between 8 and 10, between 8 and 9, between 9 and 10, or at pH 8.0, pH 8.5, pH 9.0, pH, 9.5, or pH 10, and optionally with a mobile phase A comprising ammonium formate and a mobile phase B comprising ammonium formate and acetonitrile.

6. The method of claim 1, wherein the high pH RPLC survey scan and the high pH RPLC performed on the sample or digested sample are each performed at substantially the same flow rate, pH, temperature, pressure, and/or column type.

7. The method of claim 1, wherein the low pH RPLC is performed at a pH between 2 and 4.5, between 2 and 4, between 2 and 3, between 2 and 2.5, between 2.5 and 3, between 3 and 4, or at pH 2.0, pH 2.5, pH 3.0, pH 3.5, pH 4.0, or pH 4.5, and optionally with a mobile phase A comprising formic acid and a mobile phase B comprising formic acid and acetonitrile.

8. The method of claim 1, wherein the sample is a biological sample.

9. The method of claim 8, wherein the sample is a biological fluid sample, optionally comprising tears, saliva, lymph fluid, urine, serum, cerebral spinal fluid, pleural effusion, ascites, or plasma, or wherein the sample is a tissue sample; optionally wherein the sample is treated to enrich or extract components comprising the analyte prior to use in the method.

10. The method of claim 1, wherein the portion of the high pH RPLC eluate on which the low pH RPLC is performed corresponds to a portion comprising $T_{apex}$ for the analyte+/− 0.25 minutes at a flow rate of 8 μl/min in a C18 column, $T_{apex}$ for the analyte+/−0.3 minutes at a flow rate of 8 μl/min in a C18 column, or $T_{apex}$ for the analyte+/−between 0.25 and 0.30 minutes at a flow rate of 8 μl/min on a C18 column.

11. The method of claim 1, wherein the method detects more than one analyte in the sample, optionally wherein levels of two or more analytes are determined, and optionally wherein the more than one analyte comprises a modified and unmodified form of a molecule.

12. The method of claim 11, wherein the method detects a modified and unmodified form of a molecule, wherein the modified and unmodified forms comprise a modified and unmodified protein.

13. The method of claim 1, wherein detecting the analyte by MS following the low pH RPLC comprises quantitatively determining the amount or concentration of the analyte in the sample.

14. The method of claim 1, wherein the MS is tandem MS (MS/MS), multiple reaction monitoring (MRM), single ion monitoring (SIM), triple stage quadrupole (TSQ), quadrupole/time of flight (QTOF), quadrupole linear ion trap (QTRAP), hybrid ion trap/FTMS, time of flight/time of flight (TOF/TOF), or tandem in time MS/MS.

15. The method of claim 1, wherein the method allows for at least 30-fold or for 30 to 100-fold greater sensitivity in analyte detection than a single dimension high performance liquid chromatography-tandem (HPLC-tandem) MS (1D-LC-MS/MS) process at microflow rates, and/or wherein the method allows for at least 100-fold greater sensitivity in analyte detection than a single dimension HPLC-tandem MS (1D-LC-MS/MS) process at analytical flow rates.

16. The method of claim 1, wherein the method allows for detection of an analyte in a tissue sample at a concentration of less than 10 fmol/μg total protein, less than 1 fmol/μg total protein, 1-10 fmol/μg total protein, less than 0.1 fmol/μg total protein, 0.1-1 fmol/μg total protein, or between 0.01 and 0.1 fmol/μg total protein; and/or wherein the method allows for detection of an analyte in a fluid sample at a concentration of less than 10 ng/mL, less than 1 ng/mL, less than 100 pg/mL, less than 10 pg/mL, or at a concentration of 1-10 ng/ml, 100 pg/mL to 1 ng/ml, or 10-100 pg/mL.

17. A method of detecting a peptide analyte in a sample, comprising:
(a) obtaining an experimental sample and performing an affinity-based capture to isolate a protein in the sample;
(b) digesting the captured protein with a protease to obtain a peptide analyte for detection;
(c) performing high pH reversed phase liquid chromatography (RPLC) survey scan with detection by mass spectrometry (MS) on the peptide analyte at previously determined concentration in the presence of an internal standard peptide, to determine the peak apex ($T_{apex}$) of the analyte;
(d) performing high pH RPLC on the digested sample of (b) comprising the peptide analyte;
(e) collecting at least a portion of the high pH RPLC eluate of (d) corresponding to $T_{apex}$ for the analyte+/− average peak width of the analyte, the internal standard, or a peptide in the survey scan of (c), wherein the at least a portion is optionally collected in a trap column;
(f) performing low pH RPLC on the collected portion of the high pH RPLC eluate of (e); and
(g) detecting the analyte by MS.

18. The method of claim 17, wherein the protein is captured by attachment to particles coated with a binding partner for the protein, optionally wherein the particles are coated with protein A, protein G, or a protein A and protein G chimera.

19. The method of claim 17, wherein the protease comprises one or more of: trypsin, endoproteinase LysC, endoproteinase ArgC, staph aureus V8, endoproteinase GluC, chymotrypsin, or papain.

* * * * *